United States Patent
Tamrakar et al.

(10) Patent No.: US 8,345,930 B2
(45) Date of Patent: Jan. 1, 2013

(54) METHOD FOR COMPUTING FOOD VOLUME IN A METHOD FOR ANALYZING FOOD

(75) Inventors: Amir Tamrakar, Philadelphia, PA (US); Harpreet Singh Sawhney, West Windsor, NJ (US); Qian Yu, Princeton, NJ (US); Ajay Divakaran, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 446 days.

(21) Appl. No.: 12/758,208

(22) Filed: Apr. 12, 2010

(65) Prior Publication Data

US 2011/0182477 A1 Jul. 28, 2011

Related U.S. Application Data

(60) Provisional application No. 61/297,516, filed on Jan. 22, 2010.

(51) Int. Cl.
*G06K 9/00* (2006.01)
(52) U.S. Cl. ........................................................ 382/110
(58) Field of Classification Search .................. 382/110, 382/141, 145; 434/127; 177/25.16
See application file for complete search history.

(56) References Cited

U.S. PATENT DOCUMENTS

| | | | |
|---|---|---|---|
| 6,508,762 B2* | 1/2003 | Karnieli | 600/300 |
| 2003/0076983 A1* | 4/2003 | Cox | 382/110 |
| 2009/0012433 A1* | 1/2009 | Fernstrom et al. | 600/593 |
| 2009/0080706 A1* | 3/2009 | Tao et al. | 382/110 |

OTHER PUBLICATIONS

Sun et al ("Determination of Food Portion Size by Image Processing"), 30th Internation IEEE EMBS Conference, Canada, Aug. 2008.*
Chalidabhongse et al ("2D/3D Vision-Based Mango's Feature Extraction and Sorting"), King Mongkut's Institute of Technology, Thailand, 2006.*
F. Zhu et al., "Technology-assisted dietary assessment," SPIE, 2008.
N. Dalal et al.,"Human detection using oriented histograms of flow and appearance," ECCV, 2008, pp. 428-441.
M. Varna and D. Ray, "Learning the discriminative power invariance tradeoff," ICCV, 2007.

(Continued)

*Primary Examiner* — Chan S Park
*Assistant Examiner* — Shervin Nakhjavan
(74) *Attorney, Agent, or Firm* — Moser Taboada

(57) ABSTRACT

A computer-implemented method for estimating a volume of at least one food item on a food plate is disclosed. A first and second plurality of images are received from different positions above a food plate, wherein angular spacing between the positions of the first plurality of images is greater than angular spacing between the positions of the second plurality of images. A first set of poses of each of the first plurality of images is estimated. A second set of poses of each of the second plurality of images is estimated based on at least the first set of poses. A pair of images taken from each of the first and second plurality of images is rectified based on at least the first and second set of poses. A 3D point cloud is reconstructed based on at least the rectified pair of images. At least one surface of the at least one food item above the food plate is estimated based on at least the reconstructed 3D point cloud. The volume of the at least one food item is estimated based on the at least one surface.

22 Claims, 25 Drawing Sheets

OTHER PUBLICATIONS

W. Cai, Q. Yu, H. Wang, and J. Zheng "A fast contour-based approach to circle and ellipse detection," in: 5th IEEE World Congress on Intelligent Control and Automation (WCICA) 2004.

M. Varma and A. Zisserman, "Classify images of materials: Achieving viewpoint and illumination independence," in ECCV, pp. 255-271, 2002.

M. Varma and A. Zisserman, "Texture classification: Are filter banks necessary?" in CVPR, pp. 691-698, 2003.

D. Lowe, "Distinctive image features from scale-invariant keypoints," IJCV, pp. 91-110, 2004.

K. Mikolajczyk and C. Schmid, "A performance evaluation of local descriptors," PAMI, pp. 1615-1630, 2005.

R. E. Schapire, Y. Freund, P. Bartlett, and W. S. Lee, "Boosting the margin: A new explanation for the effectiveness of voting methods," The Annals of Statistics, pp. 1651-1686, 1998.

J. Zhang, M. Marszalek, S. Lazebnik, and C. Schmid, "Local features and kernels for classification of texture and object categories: A comprehensive study," IJCV, pp. 213-238.

C. Harris and M. Stephens, "A combined corner and edge detector," in the 4th Alvey Vision Conference, 1988.

D. Nister, O. Naroditsky, and J. Bergen, "Visual odometry," in CVPR, 2004.

R. Hartley and A. Zisserman, "Multiple View Geometry in Computer Vision," Cambridge University Press, 2000, pp. 120-122.

* cited by examiner

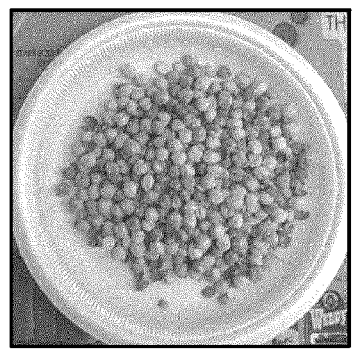
FIG. 8A
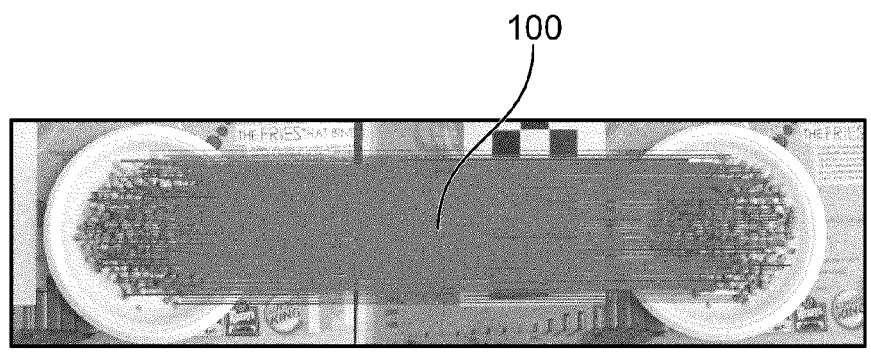
FIG. 8B
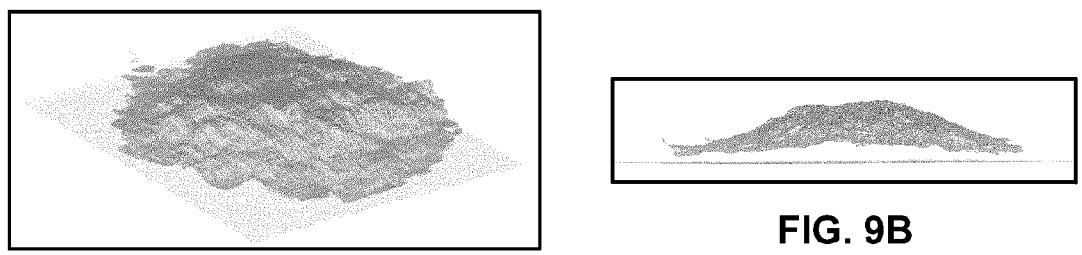
FIG. 9A
FIG. 9B

Pictures Taken

Image 5

Image 3

Image 1

Image 4

Image 2

Images Rectified

Image 5
Rectified

Image 4
Rectified

Surface Reconstructed

Surface Reconstructed

METHOD FOR COMPUTING FOOD VOLUME IN A METHOD FOR ANALYZING FOOD

CROSS-REFERENCE TO RELATED APPLICATIONS

This application claims the benefit of U.S. provisional patent application No. 61/297,516 filed Jan. 22, 2010, the disclosure of which is incorporated herein by reference in its entirety.

GOVERNMENT RIGHTS IN THIS INVENTION

This invention was made with U.S. government support under contract number NIH 1U01HL091738-01. The U.S. government has certain rights in this invention.

FIELD OF THE INVENTION

The invention relates generally to vision systems. More specifically, the invention relates to a system and method for automatically identifying items of food on a plate and computing the volume of each food item with or without the use of a 3D marker for determining camera focal length and to aid in making a determination of the caloric content of the food on the plate.

BACKGROUND OF THE INVENTION

Studies have shown that a healthy diet can significantly reduce the risk of disease. This may provide a motivation, either self-initiated or from a doctor, to monitor and assess dietary intake in a systematic way. It is known that individuals do a poor job of assessing their true dietary intake. In the kitchen when preparing a meal, one can estimate the total caloric content of a meal by looking at food labels and calculating portion size, given a recipe of amounts of ingredients. At a restaurant, estimating caloric content of a meal is more difficult. A few restaurants may list in their menus the calorie value of certain low fat/dietary conscience meals, but the majority of meals are much higher in calories, so they are not listed. Even dieticians need to perform complex lab measurements to accurately assess caloric content of foods.

Human beings are good at identifying food, such as the individual ingredients of a meal, but are known to be poor at volume estimation, and it is nearly impossible even of one had the total volume of a meal to estimate the volume of individual ingredients, which may be mixed and either seen or unseen. It is difficult for an individual to measure nutritional consumption by individuals in an easy yet quantitative manner. Several software applications, such as CalorieKing™, CaloricCounter™, etc., are of limited value since they perform a simple calculation based on portion size which cannot be accurately estimated by users. Veggie Vision™ claims to automatically recognize fruits and vegetables in a supermarket environment during food checkout. However, there are few, if any, published technical details about how this is achieved.

Automatic image analysis techniques of the prior art are more successful at volume computation than at food item identification. Automated and accurate food recognition is particularly challenging because there are a large number of food types that people consume. A single category of food may have large variations. Moreover, diverse lighting conditions may greatly alter the appearance of food to a camera which is configured to a capture food appearance data. In F. Zhu et al., "Technology-assisted dietary assessment," SPIE, 2008, ("hereinafter "Zhu et al."), Zhu et al. uses an intensity-based segmentation and classification of each food item using color and texture features. Unfortunately, the system of Zhu et al. does not estimate the volume of food needed for accurate assessment of caloric content. State of the art object recognition methods, such as the methods described in M. Everingham et al., "The PASCAL Visual Object Classes Challenge 2008 (VOC2008)," are unable to operate on a large number of food classes.

Recent success in recognition is largely due to the use of powerful image features and their combinations. Concatenated feature vectors are commonly used as input for classifiers. Unfortunately, this is feasible only when the features are homogeneous, e.g., as in the concatenation of two histograms (HOG and IMH) in N. Dalal et al., "Human detection using oriented histograms of flow and appearance," ECCV, 2008. Linear combinations of multiple non-linear kernels, each of which is based on one feature type, is a more general way to integrate heterogeneous features, as in M. Varna and D. Ray, "Learning the discriminative power invariance tradeoff," ICCV, 2007. However, both the vector concatenation and the kernel combination based methods require computation of all of the features.

Accordingly, what would be desirable, but has not yet been provided, is a system and method for effective and automatic food volume estimation for large numbers of food types and variations under diverse lighting conditions.

SUMMARY OF THE INVENTION

The above-described problems are addressed and a technical solution achieved in the art by providing a method and system for analyzing at least one food item on a food plate, the method being executed by at least one processor, comprising the steps of receiving a plurality of images of the food plate; receiving a description of the at least one food item on the food plate; extracting a list of food items from the description; classifying and segmenting the at least one food item from the list using color and texture features derived from the plurality of images; and estimating the volume of the classified and segmented at least one food item. The system and method may be further configured for estimating the caloric content of the at least one food item. The description may be at least one of a voice description and a text description. The system and method may be further configured for profiling at least one of the user and meal to include at least one food item not input during the step of receiving a description of the at least one food item on the food plate.

Classifying and segmenting the at least one food item may further comprise: applying an offline feature-based learning method of different food types to train a plurality of classifiers to recognize individual food items; and applying an online feature-based segmentation and classification method using at least a subset of the food type recognition classifiers trained during offline feature-based learning. Applying an offline feature-based learning method may further comprise: selecting at least three images of the plurality of images, the at least three images capturing the same scene; color normalizing one of the three images; employing an annotation tool is used to identify each food type; and processing the color normalized image to extract color and texture features. Applying an online feature-based segmentation and classification method may further comprise: selecting at least three images of the plurality of images, the at least three images capturing the same scene; color normalizing one of the three images; locating the food plate using a contour based circle detection method; and processing the color normalized image to extract color and texture features. Color normalizing may comprise detecting a color pattern in the scene.

According to an embodiment of the invention, processing the at least three images to extract color and texture features may further comprise: transforming color features to a CIE L*A*B color space; determining 2D texture features by applying a histogram of orientation gradient (HOG) method; and placing the color features and 2D texture features into bins of histograms in a higher dimensional space. The method may further comprise: representing at least one food type by a cluster of color and texture features in a high-dimensional space using an incremental K-means clustering method; representing at least one food type by texton histograms; and classifying the one food type using an ensemble of boosted SVM classifiers. Applying an online feature-based segmentation and classification method may further comprise: applying a k-nearest neighbors (k-NN) classification method to the extracted color and texture features to each pixel of the color normalized image and assigning at least one label to each pixel; applying a dynamic assembled multi-class classifier to an extracted color and texture feature for each patch of the color normalized image and assigning one label to each patch; and applying an image segmentation technique to obtain a final segmentation of the plate into its constituent food labels.

According to a preferred embodiment of the invention, the processing the at least three images to extract color and texture features may further comprise: extracting color and texture features using Texton histograms; training a set of one-versus-one classifiers between each pair of foods; and combining color and texture information from the Texton histograms using an Adaboost-based feature selection classifier. Applying an online feature-based segmentation and classification method may further comprise: applying a multi-class classifier to every patch of the three input images to generate a segmentation map; and dynamically assembling a multi-class classifier from a subset of the offline trained pairwise classifiers to assign a small set of labels to each pixel of the three images.

Features may be selected for applying a multi-class classifier to every patch of the three input images by employing a bootstrap procedure to sample training data and select features simultaneously. The bootstrap procedure may comprise: randomly sampling a set of training data and computing all features in feature pool; training individual SVM classifiers; applying a 2-fold validation process to evaluate the expected normalized margin for each feature to update the strong classifier; applying a current strong classifier to densely sampled patches in the annotated images, wherein wrongly classified patches are added as new samples, and weights of all training samples are updated; and stopping the training if the number of wrongly classified patches in the training images falls below a predetermined threshold.

According to an embodiment of the present invention, estimating volume of the classified and segmented at least one food item may further comprise: capturing a set of three 2D images taken at different positions above the food plate with a calibrated image capturing device using an object of known size for 3D scale determination; extracting and matching multiple feature points in each image frame estimating relative camera poses among the three 2D images using the matched feature points; selecting two images from the three 2D images to form a stereo pair and from dense sets of points, determining correspondences between two views of a scene of the two images; performing a 3D reconstruction on the correspondences to generate 3D point clouds of the at least one food item; and estimating the 3D scale and table plane from the reconstructed 3D point cloud to compute the 3D volume of the at least one food item.

According to another embodiment of the present invention, a computer-implemented method for estimating a volume of at least one food item on a food plate comprises the steps of: receiving a first plurality of images and a second plurality of images from different positions above a food plate, wherein angular spacing between the positions of the first plurality of images are greater than angular spacing between the positions of the second plurality of images; estimating a first set of poses of each of the first plurality of images; estimating a second set of poses of each of the second plurality of images based on at least the first set of poses; rectifying a pair of images taken from each of the first and second plurality of images based on at least the first and second set of poses; reconstructing a 3D point cloud based on at least the rectified pair of images; estimating at least one surface of the at least one food item above the food plate based on at least the reconstructed 3D point cloud; and estimating the volume of the at least one food item based on the at least one surface.

The method may further comprise extracting and matching a plurality of SIFT feature points among each of the first and second plurality of images to produce feature correspondences. The method may further comprise the step of producing a sparse 3D point cloud of matched features corresponding to the first plurality of images. The step of estimating a second set of poses of each of the second plurality of images is further based on the sparse 3D point cloud. Focal lengths corresponding to the first plurality of images are optimized based on at least a subset of the feature correspondences, and wherein focal lengths corresponding to the second plurality of images are optimized based on at least the sparse 3D point cloud.

According to an embodiment of the present invention, reconstructing the 3D point cloud further comprises the step of (a) decomposing the rectified pair of images using an image pyramid to estimate a disparity image; (b) establishing image patch correspondences between the rectified pair of images and the disparity image over the entire rectified stereo pair and the disparity image using correlation to produce a correlated disparity image; (c) converting the correlated disparity image to a depth image for a selected image of the rectified pair of images; (d) employing a depth value for a selected pixel in the depth image along with pixel coordinates of the corresponding pixel in the depth image and pose information for the selected image to locate the selected pixel in 3D space coordinates; and (e) repeating step (d) for all of the remaining pixels in the depth image to produce the reconstructed 3D point cloud. Estimating a pose further comprises the steps of: (a) establishing a plurality of feature tracks from image patch correspondences; (b) applying a preemptive RANSAC-based method to the feature tracks to produce a best pose for a first camera view; and (c) refining the best pose using an iterative minimization of a robust cost function of re-projection errors through a Levenberg-Marquardt method to obtain a final pose.

According to an embodiment of the present invention, reconstructing the 3D point cloud may further comprise estimating a 3D scale factor by employing an object with known dimensions placed and captured along with the at least one food item on a food plate in the plurality of images.

According to an embodiment of the present invention, estimating at least one surface based on at least the reconstructed 3D point cloud further comprises the step of estimating a table plane associated with the food plate. Estimating the table plane further comprises the steps of employing RANSAC to fit a 3D plane equation to feature points used for pose estimation; and removing points falling on the plate for the purpose of plane fitting by using the boundaries obtained from a plate detection step. The method may further comprise the step of using the estimated table plane to slice the reconstructed 3D point cloud into an upper and lower portion such that only 3D points above the table plane are considered for the purpose of volume estimation. The method may further comprise the step of employing at least one segmentation mask produced by a classification engine to partition the 3D points above the table plane into at least one surface belonging to the at least one food item.

According to an embodiment of the present invention, computing the volume of the at least one food item further comprises the steps of: (a) performing Delaunay triangulation to fit the at least one surface of the at least one of food item to obtain a plurality of Delaunay triangles; and (b) calculating a volume of the at least one food item as a sum of individual volumes for each Delaunay triangle obtained from step (a).

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 8A shows a cropped left image of the food plate used in a dense stereo matching step of FIG. 7;

FIG. 8B shows the corresponding matches between left and right frames of the food plate of FIG. 8A by a set of horizontal lines using the dense stereo matching step of FIG. 7;

FIG. 9A displays a top perspective view of a 3D point cloud for an image of the food plate of FIG. 8A obtained after performing the stereo reconstruction step of FIG. 7;

FIG. 9B displays a side view of a 3D point cloud for an image of the food plate of FIG. 8A obtained after performing the stereo reconstruction step of FIG. 7;

It is to be understood that the attached drawings are for purposes of illustrating the concepts of the invention and may not be to scale.

DETAILED DESCRIPTION OF THE INVENTION

Figure 1:
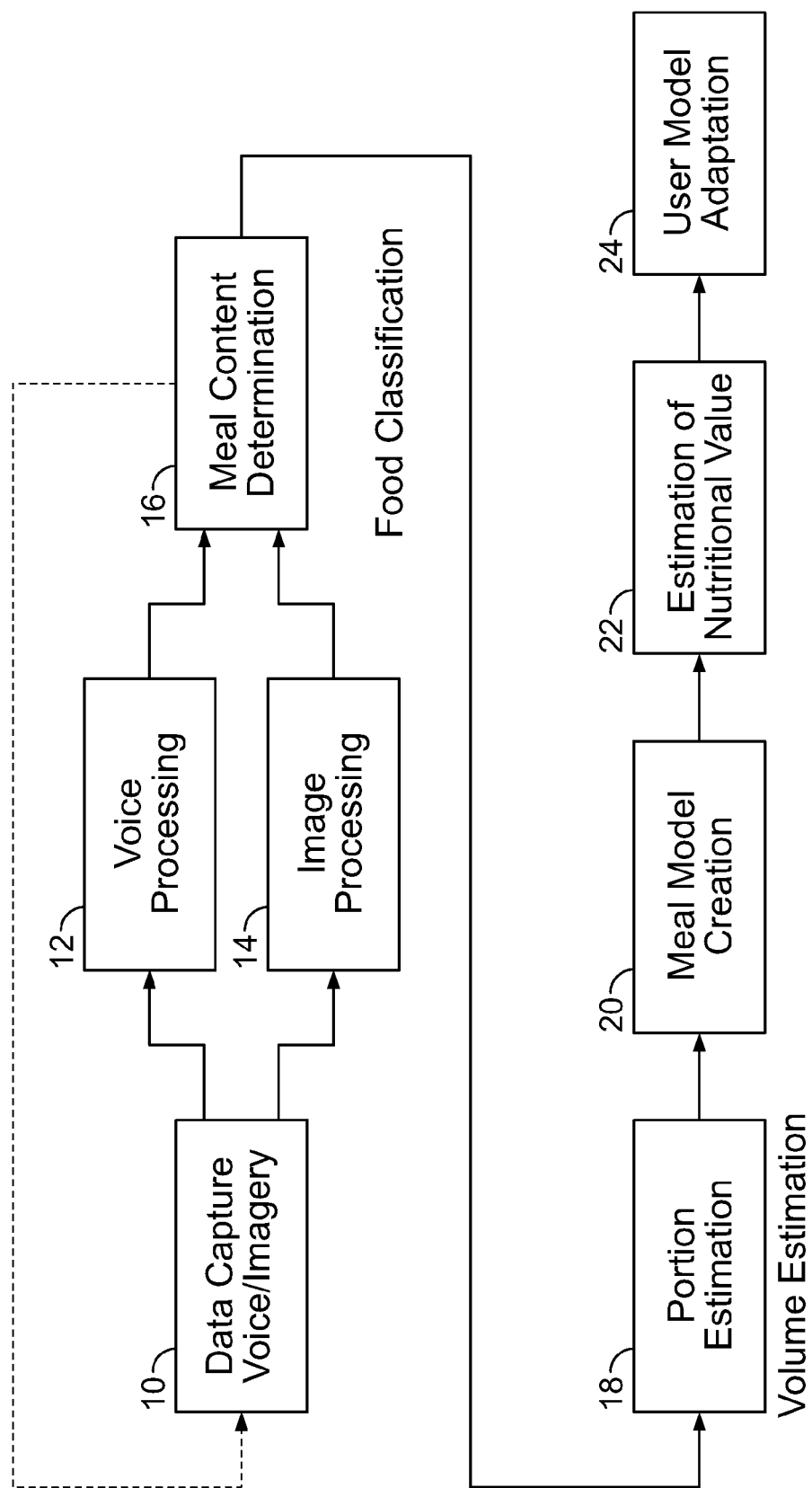
FIG. 1 is a process flow diagram illustrating exemplary modules/steps for food recognition, according to an embodiment of the present invention.
Figure 2:
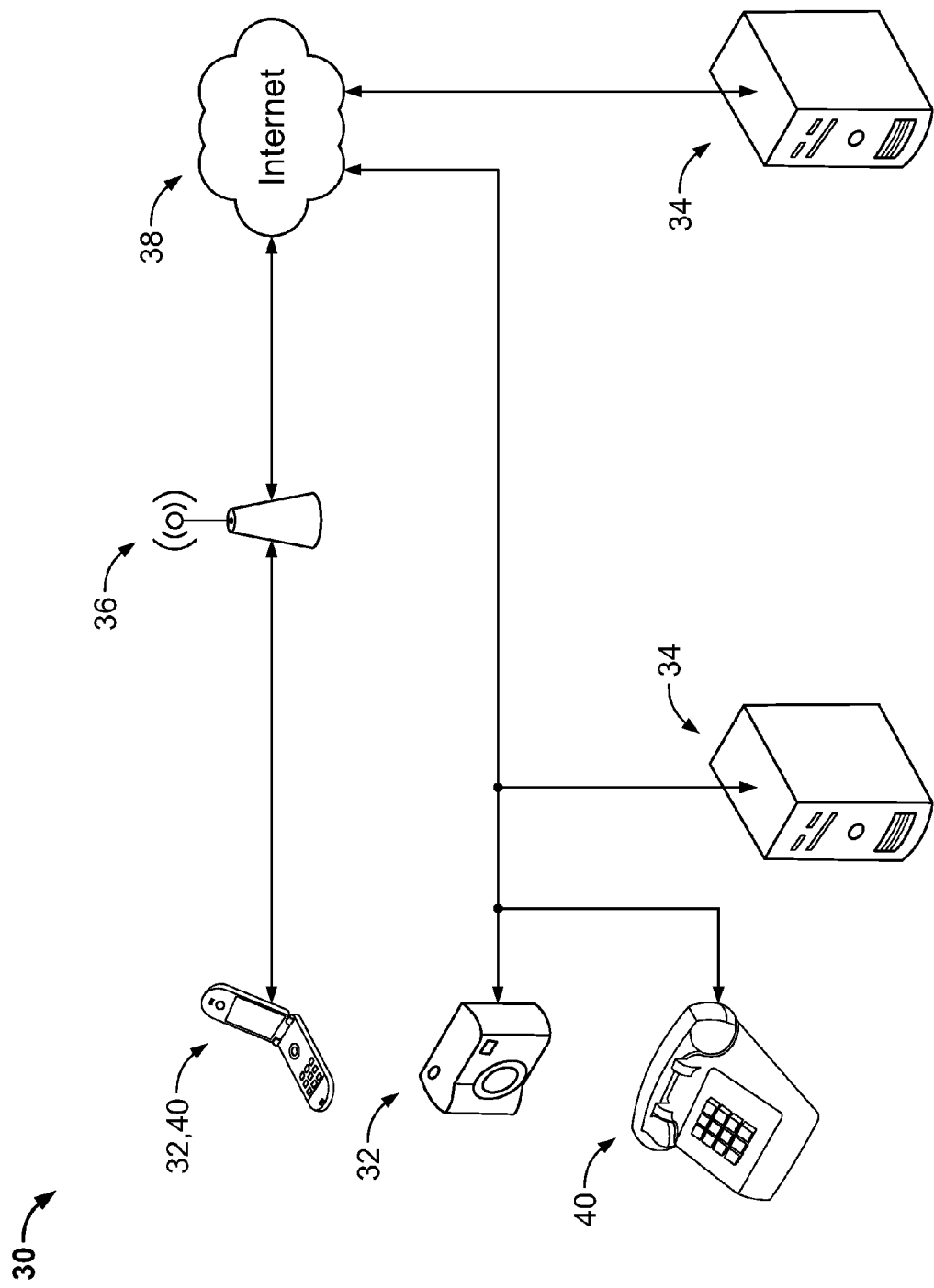
FIG. 2 is an exemplary hardware architecture of a food recognition system, according to an embodiment of the present invention.

FIG. 1 is a process flow diagram illustrating exemplary modules/steps for food recognition, according to an embodiment of the present invention. FIG. 2 is an exemplary hardware architecture of a food recognition system 30, according to an embodiment of the present invention. Referring now to FIGS. 1 and 2, in data capturing module 10, visual and audio and/or text data are captured pertaining to a plate of food. According to a preferred embodiment of the present invention, a plurality of images of a food plate is taken by an image capturing device 32. The image capturing device 32 may be, for example, a cell phone or smart phone equipped with a camera, a laptop or desktop computer or workstation equipped with a webcam, or any camera operating in conjunction with a computing platform. In a preferred embodiment, the images are either directly transferred to an image and voice processing server/computer 34 comprising at least one processor directly connected to the image capturing device 32 via, for example, a USB cable, or remotely to the image and voice processing server/computer 34 over a cell network 36 and/or the Internet 38. In data capturing module 10, according to an embodiment of the present invention, data describing the types of items of food on the food plate may be captured by a description recognition device 40 for receive a description of items on the food plate from the user in a processing step 12. According to an embodiment of the present invention, the description recognition device may be, but is not limited to, a voice recognition device, such as a cell phone or voice phone. Alternatively, the description recognition device 40 may be provided with a menu of items that may be present in a meal from which the user chooses, or the user may input food items by inputting text which is recognized by a text recognition device. The image capturing device 32 and the description recognition device 40 may be integrated in a single device, e.g., a cell phone or smart phone. The image and voice processing server/computer 34 and/or the description recognition device 40 may be equipped with automatic speech recognition software.

Figure 3A:
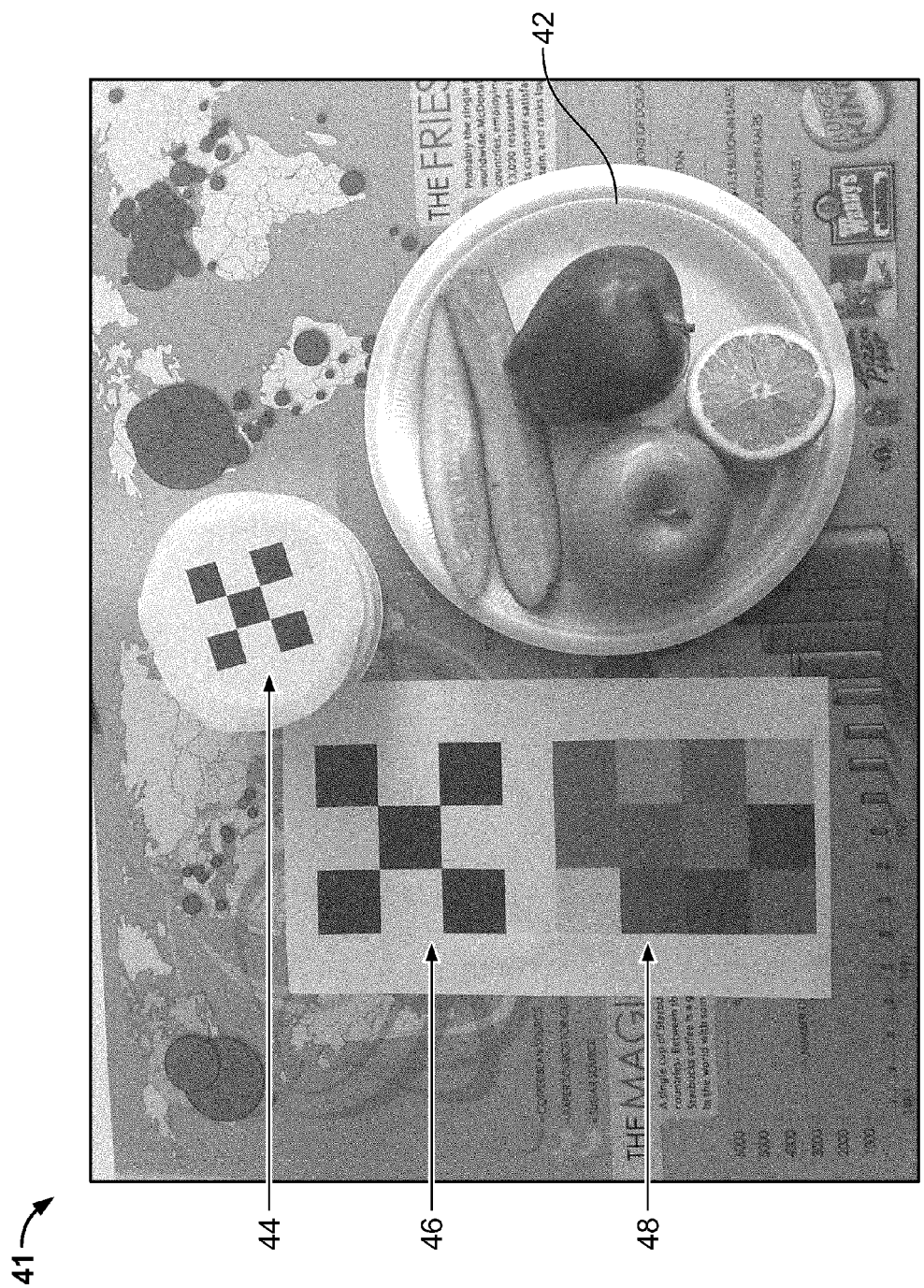
FIG. 3A is an image of a typical table setup for one image taken by the image capturing device of FIG. 2, according to an embodiment of the present invention.
Figure 3B:
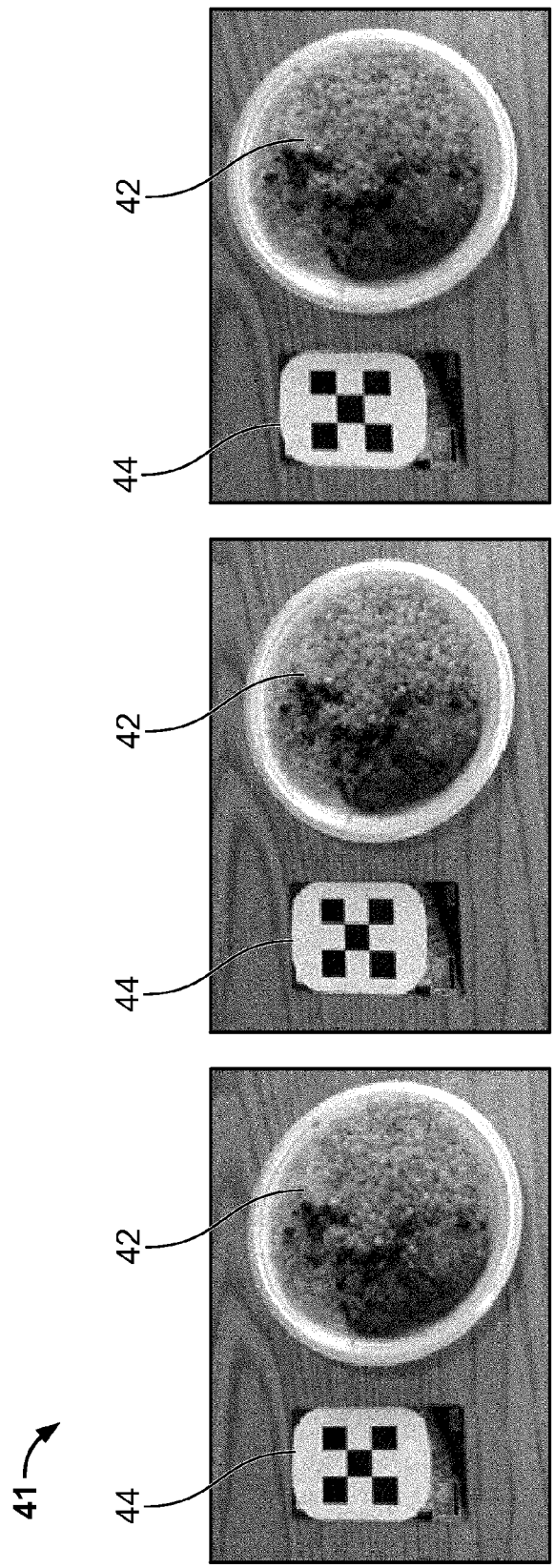
FIG. 3B shows three images of the table setup of FIG. 3A taken by the image capturing device of FIG. 2 from three different positions, according to an embodiment of the present invention.

FIG. 3A is an image 41 of a typical table setup taken by the image capturing device 32 of FIG. 2, according to an embodiment of the present invention. FIG. 3B shows three images 41 of the table setup of FIG. 3A taken by the image capturing device of FIG. 2 from three different positions (or, alternatively, one image each taken by up to three image capturing devices 32 located at three different positions). The images 41 may include a food plate 42 containing one or more food items, a 3D marker 44, a metric calibration checkerboard 46, and a color normalization grid 48, to be described hereinbelow. The images 41 may be subject to parallax and substantially different lighting conditions.

The system 30 of FIG. 2 needs to have some guidance with respect to the size of items on a food plate 42 because the 3D structure of scene and the poses of the image capturing device (s) 32 taking the images need to be estimated simultaneously. If the image capturing device(s) 32 have fixed focal lengths, as is found in early versions of cell phone cameras, then only a metric calibration checkerboard 46 and a color normalization grid 48 are needed. The metric calibration checkerboard 46 preferably has two colors: a rectangular or square black set of objects on a white background. The white background provides for a calculation of color balance, while the black object(s) provide the highest amount of color contrast and be immune to variations in lighting conditions.

Unfortunately, currently available cell phone cameras may have variable focal lengths for every picture, thus making it difficult to fully pre-calibrate them. If the focal lengths are improperly estimated, structure/pose estimations (to be described hereinbelow in connection with a portion (volume) estimation step 18 hereinbelow) may be wrong.

To this effect, a 3D marker 44 may be included in the images 41 for estimating focal lengths of image capturing device(s) 32 correctly in the image processing module 12. The 3D marker 44 may be an actual credit card or, for example, an object exhibiting a pattern of black and white squares of known size. The pattern or items located on the 3D marker 44 may be used to establish the relationship between size in image pixels and the actual size of food items 42 on the food plate say, for example, in centimeters. This provides a calibration of pixels per centimeter in the images 40 and provides an estimation of focal lengths of one or more image capturing devices 32.

According to another embodiment of the present invention, the 3D marker 44 may be eliminated yet the system 30 of FIG. 3 may still account for varying focal length by increasing the number of images taken by the one or more image capturing devices 32 using a two step procedure that replaces the single step calibration procedure above to be described hereinbelow.

According to an embodiment of the present invention, the automatic speech recognition software in the voice processing module 14 extracts the list of food from the speech input. Note that the location of the food items on the plate is not specified by the user. Referring again to FIG. 1, food items identified in the voice processing module 14 are classified in a meal content determination module 16, which makes use of the list of food items provided by the voice/image processing modules 12, 14 to first identify the types of food items on the plate.

One element of food identification includes plate finding. The list of foods items provided by automatic speech recognition in the voice processing module 14 is used to initialize food classification in the meal content determination module 16. According to an embodiment of the present invention, the food items on the food plate are classified and segmented using color and texture features. Classification and segmentation of food items in the meal content determination module 16 is achieved using one or more classifiers known in the art to be described hereinbelow. In portion estimation module 18, the volume of each of the classified and segmented food items is estimated.

In an optional meal model creation module 20, the individual segmented food items are reconstructed on a model of the food plate.

In Estimation of Nutritional Value module 22, the caloric content of the food items of the entire meal may be estimated based on food item types present on the food plate and volume of the food item. In addition to calorie count, other nutritional information may be provided such as, for example, the amount of certain nutrients such as sodium, the amount of carbohydrates versus fat versus protein, etc.

In an optional User Model Adaption module 24, a user and/or the meal is profiled for potential missing items on the food plate. A user may not identify all of the items on the food plate. Module 24 provides a means of filling in missing items after training the system 30 with the food eating habits of a user. For example, a user may always include mashed potatoes in their meal. As a result, the system 30 may include probing questions which ask the user at a user interface (not shown) whether the meal also includes items, such as mashed potatoes, that were not originally input in the voice/text recognition module 40 by the user. As another variation, the User Model Adaption module 24 may statistically assume that certain items not input are, in fact, present in the meal. The User Model Adaption module 24 may be portion specific, location specific, or even time specific (e.g., a user may be unlikely to dine on a large portion of steak in the morning).

According to an embodiment of the preset invention, plate finding comprises applying the Hough Transform to detect the circular contour of the plate. Finding the plate helps restrict the food classification to the area within the plate. A 3-D depth computation based method may be employed in which the plate is detected using the elevation of the surface of the plate.

An off-the-shelf speech recognition system may be employed to recognize the list of foods spoken by the end-user into the cell-phone. In one embodiment, speech recognition comprises matching the utterance with a pre-determined list of foods. The system 30 recognizes words as well as combinations of words. As the system 30 is scaled up, speech recognition may be made more flexible by accommodating variations in the food names spoken by the user. If the speech recognition algorithm runs on a remote server, more than sufficient computational resources are available for full-scale speech recognition. Furthermore, since the scope of the speech recognition is limited to names of foods, even with a full-size food name vocabulary, the overall difficulty of the speech recognition task is much less than that of the classic large vocabulary continuous speech recognition problem.

Figure 4A:
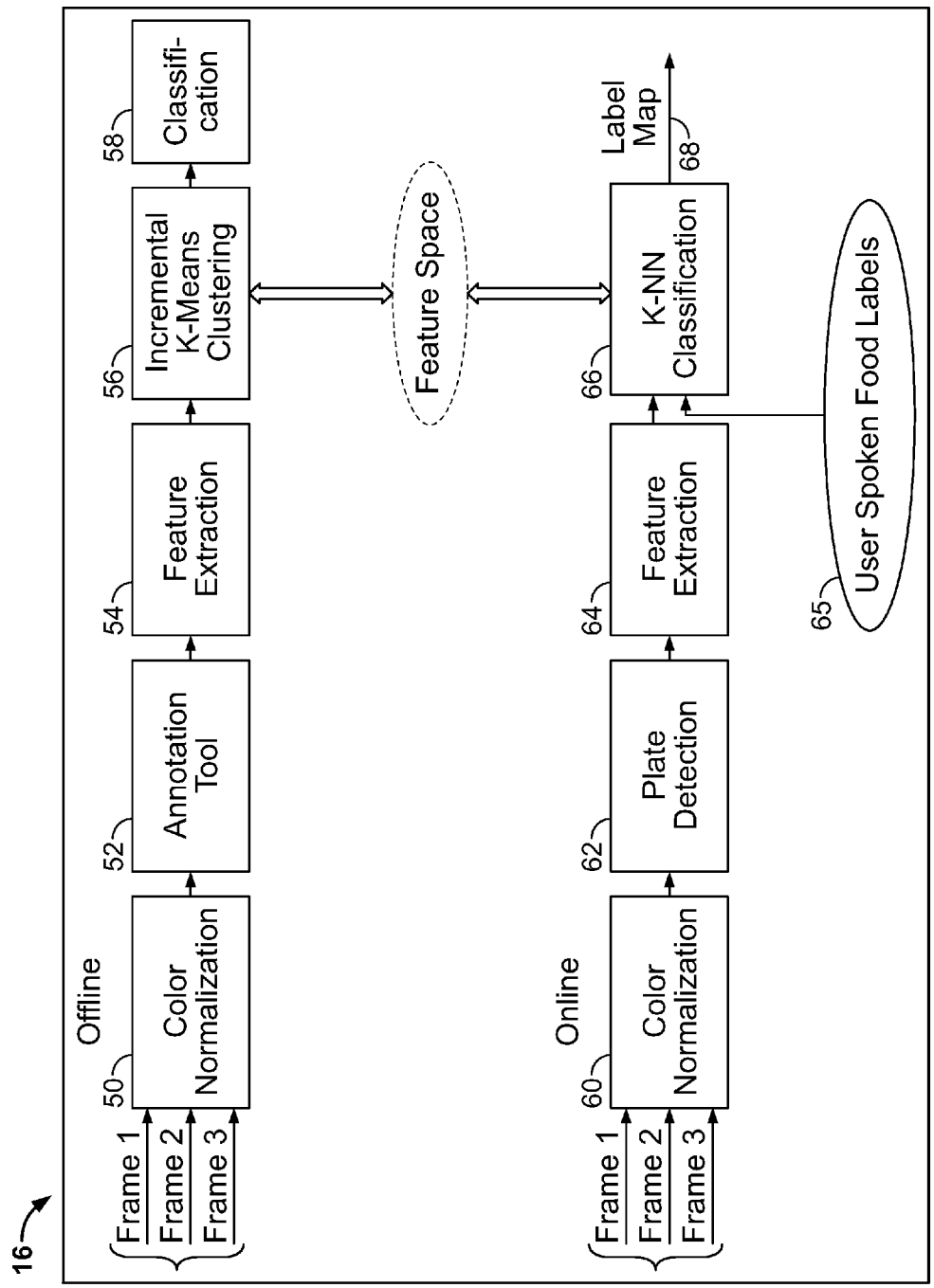
FIG. 4A is a process flow diagram illustrating exemplary steps for classifying and segmenting food items using color and texture features employed by the meal content determination module of FIG. 1, according to an embodiment of the present invention.

FIG. 4A is a process flow diagram illustrating exemplary steps for classifying and segmenting food items using color and texture features employed by the meal content determination module 16 of FIG. 1. Food classification and segmentation is achieved using offline feature-based learning of different food types which ultimately trains a plurality of classifiers to recognize individual food items and online feature-based segmentation and classification using at least a subset of the food type recognition classifiers trained during offline feature-based learning. In offline step 50 and again in online step 60, at least three frames of a plurality of frames are color normalized, the at least three images capturing the same scene. Color differences due to various lighting conditions and picture taking angles occurring in the three frames are synchronized to a single set of colors for each of the frames. To deal with varying lighting conditions, a color pattern (e.g., the color normalization grid 48 of FIG. 3A) is placed in the image for photometric calibration. Fourteen colors (12 from the color pattern and 2 from the checker-board) have been used to solve a 3×3 color transformation matrix using a least squares solution. As texture features may vary with changes in scale, normalization of scale is necessary. For this purpose, a scaling factor is determined to map the checker-board to a predetermined size (75×75 pixel). The color pattern 48 is detected in the scene and one of the three images is color normalized. At offline step 52, an annotation tool is used to identify each food type. Annotations may be provided by the user to establish ground truth. At online step 62, the plate is located by using a contour based circle detection method proposed in W. Cai, Q. Yu, H. Wang, and J. Zheng "A fast contour-based approach to circle and ellipse detection," in: *5th IEEE World Congress on Intelligent Control and Automation (WCICA)* 2004. The plate is regarded as one label during classification and plate regions are annotated as well in the training set. At both offline steps 54 and online steps 64, the color normalized image is processed to extract color and texture features. Typically the features comprise color features and 2D texture features placed into bins of histograms in a higher dimensional space. The color features are transformed to a CIE L*A*B* color space, wherein the size of the vector of the resulting histogram is:

Size of feature vector=32 dimensional histogram per channel×3 channels $(L,A,B)$=96 dimensions The 2D Texture Features are determined from both extracting HOG features over 3 scales and 4 rotations wherein:

Size of feature vector=12 orientation bins×2×2 (grid size)=48 dimensions

And from steerable filters over 3 scales and 6 rotations wherein:
Mean and variance of filter response energies is determined over all rotations per scale
The Size of feature vector=3 scales×2 (mean, variance)×16 bin histogram=96 dimensions Histograms of filter outputs are extracted over scale and orientations.

Variations of these features in terms of number of scales and orientations are also incorporated. A key innovation is the use of absolute scale in defining the scale of features by means of a calibration. Since calibration produces an absolute pixels/cm scale, scales are typically chosen in cms for representing the texture of various foods. For instance, scales of 0.5, 1, 2, 4 cms may be used to capture the texture scale of most common foods. Furthermore, an aggregation scale is defined as a multiple of these texture scales. The cms scales are converted to pixels using the calibration. According to an embodiment of the present invention, at off line step 56, each food type is represented by a cluster of color and texture features in a high-dimensional space using an incremental K-means clustering method. In offline step 58, at least one food type is represented by Texton histograms to be described hereinbelow. Food class identification may be performed using an ensemble of boosted SVM classifiers. However, for online classification step 66, since there may be a large number of food classes to be classified, a k-NN (k-nearest neighbors) classification method is used. The number of clusters chosen for each food type is performed adaptively so that an over-complete set of cluster centers is obtained. During online classification, each pixel's color and texture features are computed and assigned a set of plausible labels using the speech/text input 65 as well as color/texture k-NN classification. A dynamically assembled multi-class classifier may be applied to an extracted color and texture feature for each patch of the color normalized image and one label may be assigned to each patch. The result 68 is an assignment of a small set of labels to each pixel.

Subsequently, an image segmentation technique, such as a Belief Propagation (BP) like technique, may be applied to achieve a final segmentation of the plate into its constituent food labels. For BP, data terms comprising of confidence in the respective color and/or texture feature may be employed. Also, smoothness terms for label continuity may be employed.

Figure 4B:
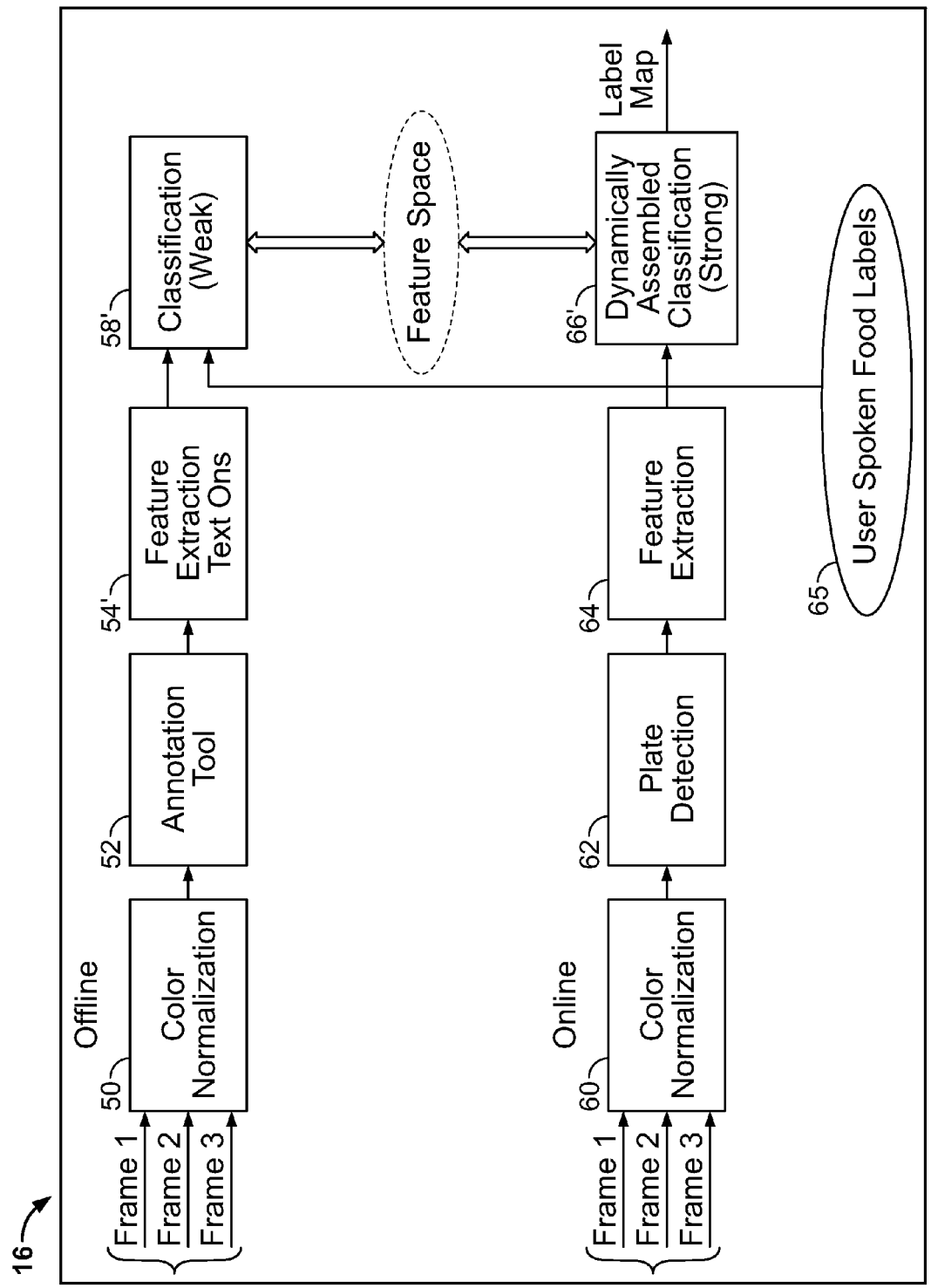
FIG. 4B is a process flow diagram illustrating exemplary steps for classifying and segmenting food items using color and texture features employed by the meal content determination module of FIG. 1, according to a preferred embodiment of the present invention.

FIG. 4B is a process flow diagram illustrating exemplary steps for classifying and segmenting food items using color and texture features employed by the meal content determination module 16 of FIG. 1. According to the preferred embodiment of the present invention of FIG. 4B, offline and online feature extraction steps 54 and 64, respectively, offline K-means clustering step 56, offline classification step 58, and on-line classification step 66 of FIG. 4A may be replaced by offline feature extraction step 54' (a corresponding online feature extraction step is not needed), offline classification step 58' and online classification step 66' of FIG. 4B. The task of food recognition is formulated in steps as a multi-class classification problem. In offline feature extraction step 54', features are extracted using Texton histograms. In offline classification step 58', multi-class recognition problem may be simplified by making use of the user providing a candidate food type set 65 acquired during speech recognition as described above. In order to make full use of this additional cue, a set of one-versus-one classifiers are trained between each pair of foods. A segmentation map is generated by applying a multi-class classifier densely (i.e., every patch) to an input image. An Adaboost-based feature selection classifier is adapted to combine color and texture information to achieve an acceptable food type recognition rate over a large number of food types. In online classification step 66' based on these offline trained pair-wise classifiers, a dynamically assembled trained classifier is created according to the candidate set on the fly to assign a small set of labels to each pixel.

Figure 5:
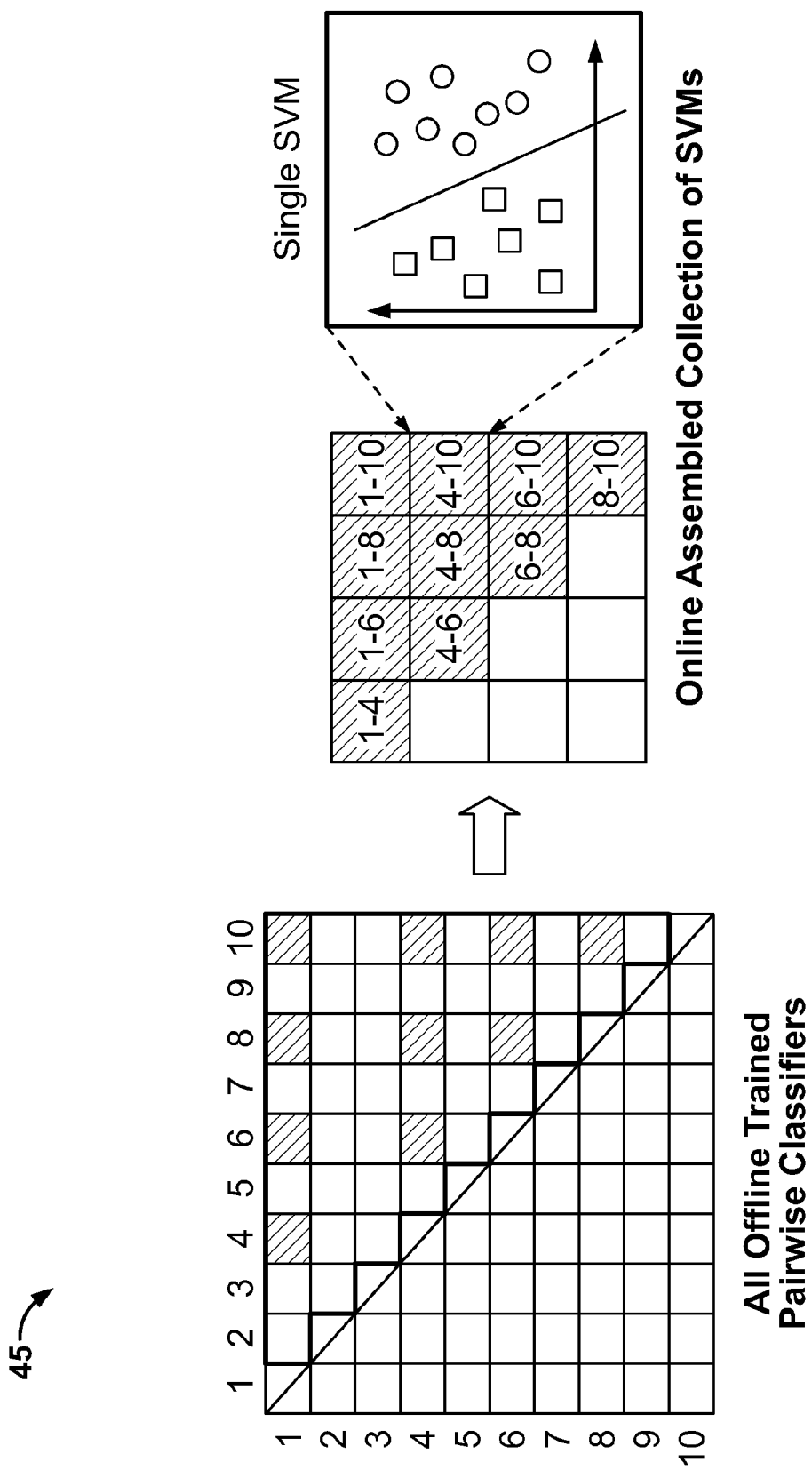
FIG. 5 shows an illustration of the pair-wise classification framework with a set of 10 classes, according to an embodiment of the present invention.

Suppose there exist N classes of food $\{f_i:i=1,\ldots N\}$, then all the pair-wise classifiers may be represented as $C=\{C_{ij}:i,j\in[1,N],i<j\}$. The total number of classifiers, $|C|$, is $N\times(N-1)/2$. For a set of K candidates, $K\times(K-1)/2$ pair-wise classifiers are selected to assemble a K-class classifier. The dominant label assigned by the selected pair-wise classifiers is the output of the K-class classification. If there is no unanimity among the K pair-wise classifiers corresponding to a food type, then the final output is set to unknown. FIG. 5 shows an illustration of the pair-wise classification framework with a set of 10 classes. The upper triangular matrix contains 45 offline trained classifiers. If 5 classes (1, 4, 6, 8 and 10) are chosen as candidates by the user, then 10 pair-wise classifiers may be assembled to form a 5-class classifier. If 4 out of 10 classifiers report the same label, this label is reported as the final label, otherwise an unknown label is reported by the 5-class classifier.

The advantages of this framework are two-fold. First, computation cost is reduced during the testing phase. Second, compared with one-versus-all classifiers, this framework avoids N imbalance in training samples (a few positive samples versus a large number of negative samples). Another strength of this framework is its extendibility. Since there are a large number of food types, users of the system 30 of FIG. 2 may incrementally update existing classes with new instances and add new food types without re-training classifiers from scratch. This pair-wise framework is easy to adapt to new classes and to new instances. If there exists N pre-trained classes, then updating a class may be accomplished by re-training (N−1) classifiers in the upper triangular matrix; adding a new class, named $f_{N+1}$, is equivalent to adding a new column (N) of classifiers $\{C_{i,N+1}:i=1,\ldots,N\}$.

To compute a label map (i.e., labels for items on a food plate), classifiers are applied densely (every patch) on the color and scale normalized images. To train such a classifier, the training set is manually annotated to obtain segmentation, in the form of label masks, of the food. Texton histograms are used as features for classification, which essentially translate to a bag-of-words. There are many approaches that have been proposed to create textons, such as spatial-frequency based textons as described in M. Varma and A. Zisserman, "Classify images of materials: Achieving viewpoint and illumination independence," in *ECCV*, pages 255-271, 2002 (hereinafter "Varma1"), MRF textons as described in M. Varma and A. Zisserman, "Texture classification: Are filter banks necessary?" In *CVPR*, pages 691-698, 2003 (hereinafter "Varma2"), and gradient orientation based textons as described in D. Lowe, "Distinctive image features from scale-invariant keypoints," *IJCV*, pages 91-110, 2004. A detailed survey and comparison of local image descriptors may be found in K. Mikolajczyk and C. Schmid, "A performance evaluation of local descriptors," *PAMI*, pages 1615-1630, 2005.

It is important to choose the right texton as it directly determines the discriminative power of texton histograms. The current features used in the system 30 include color (RGB and LAB) neighborhood features as described in Varma1 and Maximum Response (MR) features as described in Varma2. The color neighborhood feature is a vector that concatenates color pixels within an L×L patch. Note that for the case L=1 this feature is close to a color histogram. An MR feature is computed using a set of edge, bar, and block filters along 6 orientations and 3 scales. Each feature comprises eight dimensions by taking a maximum along each orientation as described in Varma2. Note that when the convolution window is large, convolution is directly applied to the image instead of patches. Filter responses are computed and then a feature vector is formed according to a sampled patch. Both color neighborhood and MR features may be computed densely in an image since the computational cost is relatively low. Moreover, these two types of features contain complementary information: the former contains color information but cannot carry edge information at a large scale, which is represented in the latter MR features; the latter MR features do not encode color information, which is useful to separate foods. It has been observed that by using only one type of feature at one scale a satisfactory result cannot be achieved over all pair-wise classifiers. As a result, feature selection may be used to create a strong classifier from a set of weak classifiers.

A pair of foods may be more separable using some features at a particular scale than using other features at other scales. In training a pair-wise classifier, all possible types and scales of features may be choose and concatenated into one feature vector. This, however, puts too much burden on the classifier by confusing it with non-discriminative features. Moreover, this is not computationally efficient. Instead, a rich set of local feature options (color, texture, scale) may be created and a process of feature selection may be employed to automatically determine the best combination of heterogeneous features. The types and scales of features used in current system are shown in Table 1.

TABLE 1

| Features options | |
|---|---|
| Type | Scale |
| Color(RGB/LAB) Neighborhood (See Varma1) | 1, 3, 5, 7 |
| Maximum Responses (See Varma2) | 0.5, 1, 2 |

The feature selection algorithm is based on Adaboost as described in R. E. Schapire, Y. Freund, P. Bartlett, and W. S. Lee, "Boosting the margin: A new explanation for the effectiveness of voting methods," *The Annals of Statistics*, pages 1651-1686, 1998, which is an iterative approach for building strong classifiers out of a collection of "weak" classifiers. Each weak classifier corresponds to one type of texton histogram. An $\chi^2$ kernel SVM is adopted to train the weak classifier using one feature in the feature pool. A comparison of different kernels in J. Zhang, M. Marszalek, S. Lazebnik, and C. Schmid, "Local features and kernels for classification of texture and object categories: A comprehensive study," *IJCV*, pages 213-238, 2007, shows that $\chi^2$ kernels outperform the rest.

A feature set $\{f_1,\ldots,f_n\}$ is denoted by F. In such circumstances, a strong classifier based on a subset of features by $\bar{F} \subset F$ may be obtained by linear combination of selected weak SVM classifiers, $h:X \to R$, $$h_F(x) = \text{sign}\left(\sum_{f_i \in \bar{F}} \alpha_{f_i} h_{f_i}(x)\right) \quad (1)$$

where $$\alpha_{f_i} = \frac{1}{2}\ln\left(\frac{1-\varepsilon_{f_i}}{\varepsilon_{f_i}}\right)$$

and $\varepsilon_{f_i}$ is the weighed error rate of the weak classifier $f_i$. For a sample x, denote its true class label by $y(=\pm 1)$. The classification margin of h on x is defined by $y \times h(x)$. The classification margin represents the discriminative power of the classifier. Larger margins imply better generalization power.

Adaboost is an approach to iteratively select the feature in the feature pool which has the largest margin according to current distribution (weights) of samples.

$$h_{k+1} = \underset{h \in F}{\operatorname{argmax}} M(H_k + h) \qquad (2)$$

where $H_k$ is the strong classifier learned in the $k^{th}$ round and $M(\cdot)$ is the expected margin on X.

As each h is a SVM, this margin may be evaluated by N-fold validation (in our case, we use N=2). Instead of comparing the absolute margin of each SVM, a normalized margin is adopted, as $$M(h, x) = \frac{yh(x)}{PhP},$$

where PhP denotes the number of support vectors. This criterion actually measures the discriminative power per support vector. This criterion avoids choosing a large-margin weak classifier that is built with many support vectors and possibly overfits the training data. Also, this criterion tends to produce a smaller number of support vectors to ensure low complexity.

Figure 6:
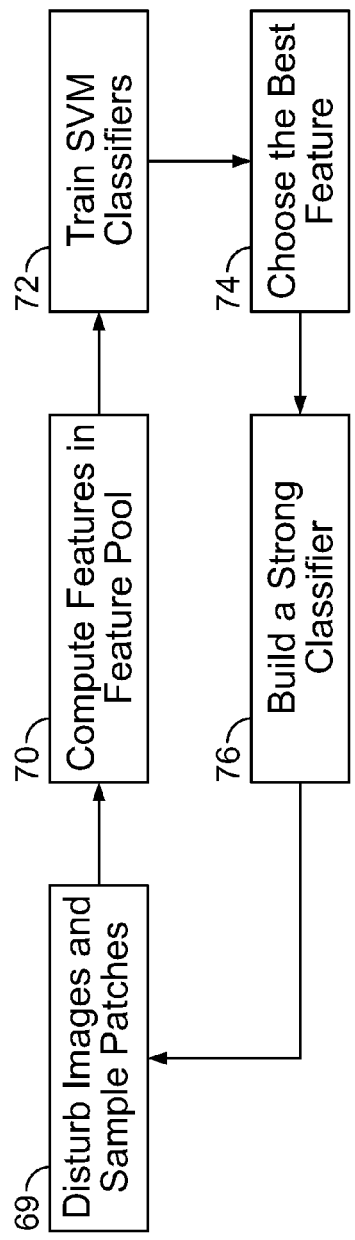
FIG. 6 is a block diagram of a bootstrap procedure for sampling training data and select features simultaneously for use in the method of FIG. 4, according to an embodiment of the present invention.

Another issue in the present invention is how to make full use of training data. Given annotated training images and a patch scale, a large number of patches may be extracted by rotating and shifting the sampling windows. Instead of using a fixed number of training samples or using all possible training patches, a bootstrap procedure is employed as shown in FIG. 6 to sample training data and select features simultaneously. Initially, at step 70, a set of training data is randomly sampled and all features in feature pool are computed. At step 72, individual SVM classifiers are trained. At step 74, a 2-fold validation process is employed to evaluate the expected normalized margin for each feature and the best one is chosen to update the strong classifier with weighted classification error step 76. The current strong classifier is applied to densely sampled patches in the annotated images, wrongly classified patches (plus the ones close to the decision boundary) are added as new samples, and weights of all training samples are updated. Note that in step 69 training images in the LAB color space are perturbed before bootstrapping. The training is stopped if the number of wrongly classified patches in the training images falls below a predetermined threshold.

Figure 7:
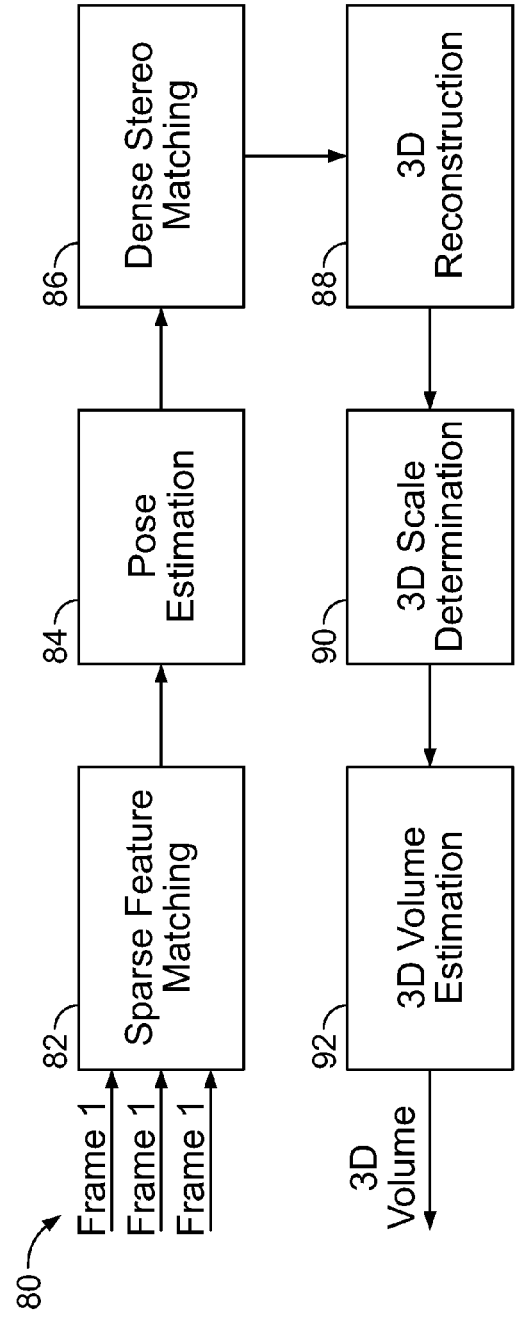
FIG. 7 is a process flow diagram illustrating exemplary steps for estimating food volume of a food plate in 3D that has been classified and segmented, according to an embodiment of the present invention.

FIG. 7 is a process flow diagram illustrating exemplary steps for estimating food volume of a food plate in 3D with cameras that may have varying focal lengths and that has been classified and segmented with the aid of a 3D marker, according to an embodiment of the present invention. In order to estimate the volume of food items on a user's plate, at step 80, according to an embodiment of the present invention, a set of three 2D images is taken at different positions above the plate with a possibly calibrated image capturing device (e.g., a cell phone camera) using an object of known size for 3D scale determination. At step 82, multiple feature points in each image frame are extracted and matches between the three 2D images. At step 84, using the matched feature points, the relative camera poses among the three 2D images are estimated. In a dense stereo matching step 86, two images from the three 2D images are selected to form a stereo pair and from dense sets of points, correspondences between the two views of a scene of the two images are found. In step 88, a 3D reconstruction is carried out on the correspondences to generate 3D point clouds of the food. Finally, from the reconstructed 3D point cloud, both the 3D scale (step 90) and table plane are estimated to compute the 3D volume of each food item (step 92).

According to an embodiment of the present invention, and referring again to step 82, the multiple feature points in each of the three 2D images are extracted and matched between images using Harris corners, as described in C. Harris and M. Stephens, "A combined corner and edge detector," in *the 4th Alvey Vision Conference,* 1988. However, any other feature which describes an image point in a distinctive manner may be used. Each feature correspondence establishes a feature track, which lasts as long as it is matched across the images. These feature tracks are later sent into the pose estimation step 84 which is carried out using a preemptive RANSAC-based method as described in D. Nister, O. Naroditsky, and J. Bergen, "Visual odometry," in CVPR, 2004 (hereinafter "Nister et al."), as explained in more detail hereinbelow.

The preemptive RANSAC algorithm randomly selects different sets of 5-point correspondences over three frames such that N number of pose hypotheses (by default N=500) are generated using a 5-point algorithm. Here, each pose hypothesis comprises the pose of the second and third view with respect to the first view. Then, starting with all of the hypotheses, each one is evaluated on chunks of M data points based on trifocal Sampson error (by default M=100), every time dropping out half of the least scoring hypotheses. Thus, initially, 500 pose hypotheses are proposed, all of which are evaluated on a subset of 100-point correspondences. Then the 500 pose hypotheses are sorted according to their scores on the subset of 100-point correspondences and the bottom half is removed. In the next step, another set of 100 data points is selected on which the remaining 250 hypotheses are evaluated and the least scoring half are pruned. This process continues until a single best-scoring pose hypothesis remains.

In the next step, the best pose at the end of the preemptive RANSAC routine is passed to a pose refinement step where iterative minimization of a robust cost function (derived from Cauchy distribution) of the re-projection errors is performed through Levenberg-Marquardt method as described in R. Hartley and A. Zisserman, "*Multiple View Geometry in Computer Vision,*" Cambridge University Press, 2000, pp. 120-122 (hereinafter "Hartley et al.").

Using the above proposed algorithm, camera poses are estimated over three views such that poses for the second and third view are with respect to the camera coordinate frame in the first view. In order to stitch these poses, the poses are placed in the coordinate system of the first camera position corresponding to the first frame in the image sequence. At this point, the scale factor for the new pose-set (poses corresponding to the second and third views in the current triple) is also estimated with another RANSAC scheme.

Once the relative camera poses between the image frames have been estimated, in a dense stereo matching step 86, two images from the three 2D images are selected to form a stereo pair and from dense sets of points, correspondences between the two views of a scene of the two images are determined. For each pixel in the left image, its corresponding pixel in the right image is searched using a hierarchal pyramid matching scheme. Once the left-right correspondence is found, in step 88, using the intrinsic parameters of the pre-calibrated camera, the left-right correspondence match is projected in 3D using triangulation. At this stage, any bad matches are filtered out by validating them against the epipolar constraint. To gain speed, the reconstruction process is carried out for all non-zero pixels in the segmentation map provided by the food classification stage. FIG. 8A shows a cropped left image of the food plate used in a dense stereo matching step 86 of FIG. 7. FIG. 8B shows the corresponding matches between left and right frames of the food plate of FIG. 8A by a set of horizontal lines 100 using the dense stereo matching step 86 of FIG. 7.

Referring again to FIG. 7, after the pose estimation step 84, there is still a scale ambiguity in the final pose of the three 2D frames. In order to recover a global scale factor, an object with known dimensions is placed and captured along with the plate of food in the image in a 3D scale determination step 90. For simplicity, according to an embodiment of the present invention, the metric calibration checkerboard 46 of FIG. 2 may be employed. In order to compute 3D scale, each corner of the checker-board in an image is detected followed by its reconstruction to obtain corresponding 3D coordinates. The size of each checker-board square is determined in 3D from its respective corners. Let $d_{Ref}$ be the real size of checker-board as measured by ground truth and $d_{Est}$ be its size as obtained by estimation in 3D. Then, the 3D scale (S) is computed using equation 3. In the present embodiment, a 3×3 checker-board may be used, with $d_{Ref}$=3.14 cms.

$$S = d_{Ref}/d_{Est} \tag{3}$$

Once the 3D scale is computed using the checker-board, an overall scale correction is made to all the camera poses over the set of frames and the frames are mapped to a common coordinate system. Following stereo reconstruction, a dense 3D point cloud for all points on the plate is obtained. FIG. 9A displays a top perspective view of a 3D point cloud for an image of the food plate of FIG. 8A obtained after performing the stereo reconstruction step 88 of FIG. 7. FIG. 9B displays a side view of a 3D point cloud for an image of the food plate of FIG. 8A obtained after performing the stereo reconstruction 88 step of FIG. 7. Since the volume of each food item needs to be measured with respect to a reference surface, estimation of the table plane is carried out as a pre-requisite step. By inspection of the image, a person skilled in the art would appreciate that, apart from pixels corresponding to food on the plate, most pixels lie on the table plane. Hence, table estimation is performed by employing RANSAC to fit a 3D plane equation on feature points earlier used for camera pose estimation. To obtain better accuracy, points falling on the plate are removed for the purpose of plane fitting by using the boundaries obtained from the plate detection step. Once the table plane has been estimated, it is used to slice the entire point cloud into two portions such that only 3D points above the plane are considered for the purpose of volume estimation.

Referring again to FIG. 7, the volume estimation step 92 is carried out in two sub-steps. First, Delaunay triangulation is performed to fit the surface of food. Second, total volume of the food ($V_{Total}$) is calculated as a sum of individual volumes ($V_i$) for each Delaunay triangles obtained from the previous step. Equation 4 shows computation of total food volume where K is the total number of triangles.

$$V_{Total} = \sum_{i=1}^{K} V_i \tag{4}$$

One of the main tasks of the present invention is to report volumes of each individual food item on a user's plate. This is done by using the binary label map obtained after food recognition. The label map for each food item consists of non-zero pixels that have been identified as belonging to the food item of interest and zero otherwise. Using this map, a subset of the 3D point cloud is selected that corresponds to reconstruction of a particular food label that is then feed it into the volume estimation process. This step is repeated for all food items on the plate to compute their respective volumes.

In the embodiment of the invention described in FIGS. 3A and 7 above, a 3-D marker 44 of known height (e.g., a coffee cup with a checker board on its lid) was placed in the scene for estimating the focal lengths of images of the food plate taken by one or more image capturing devices 32 that may have varying focal lengths. The ratio of the dimensions (in an image) of the 3-D marker 44 compared to an existing checkerboard marker 46 on the table surface allowed for the determination of the focal length of the one or more image capturing devices 32 in each image. However, the 3D marker 44 is a big inconvenience for an end user, and requires that the images be taken from an overhead view with very little displacement of the one or more image capturing devices 32 between shots. A well known problem called the "Bas-Relief Ambiguity" (see Hartley and Zisserman, "Multiple view geometry in computer vision," Second Edition, Cambridge University Press, March 2004) becomes apparent when the displacement angles between the camera poses are small, which may result in an incorrect estimation of the depth of points on a 3D surface of a volume of food items to be estimated, which may ultimately lead to an incorrect volume estimation.

Figure 10:
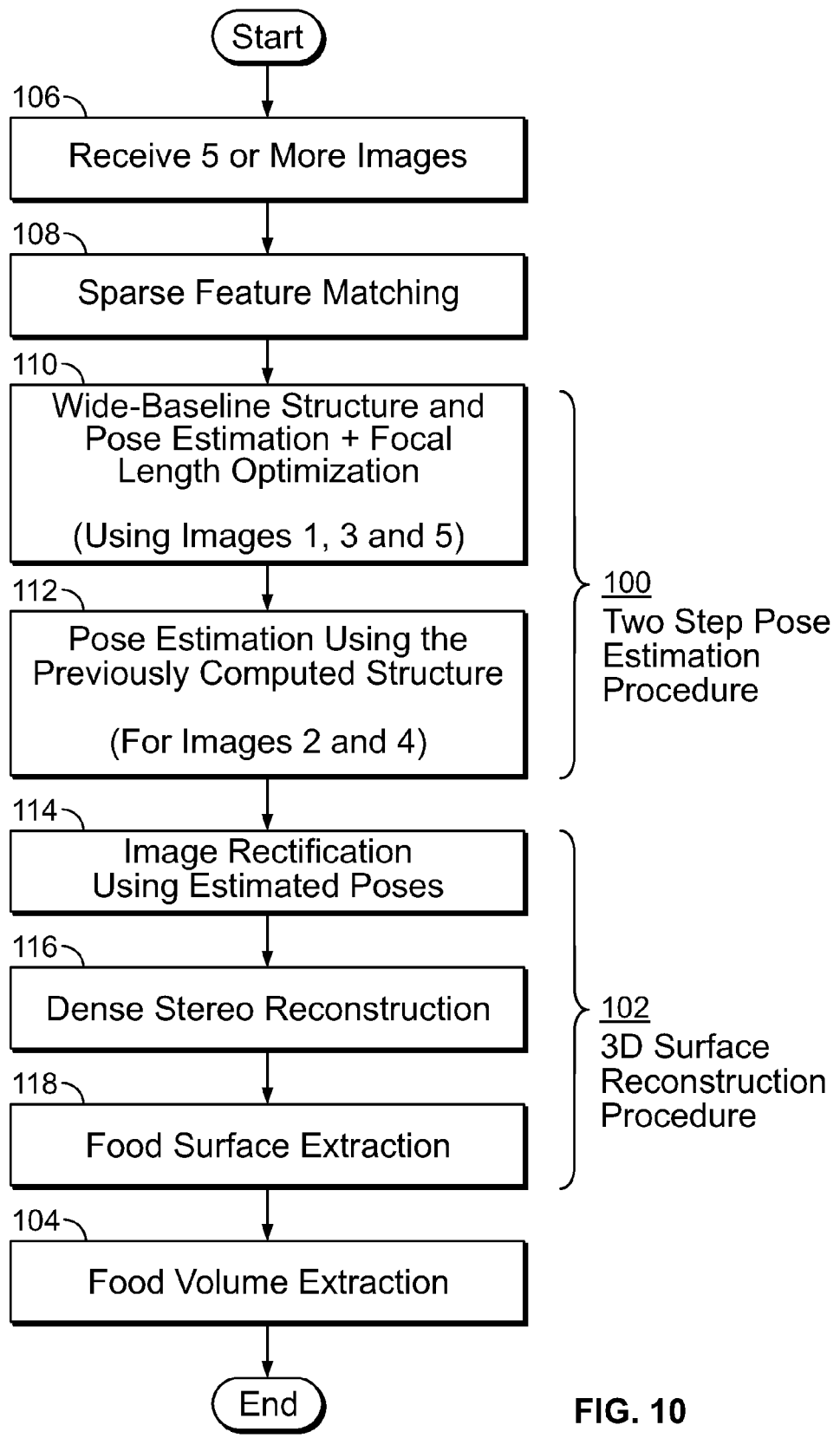
FIG. 10 illustrates an alternative method for determining a volume of a food plate without the use of a 3-D marker of known dimensions for 3D scale determination, according to an embodiment of the present invention.
Figure 11:
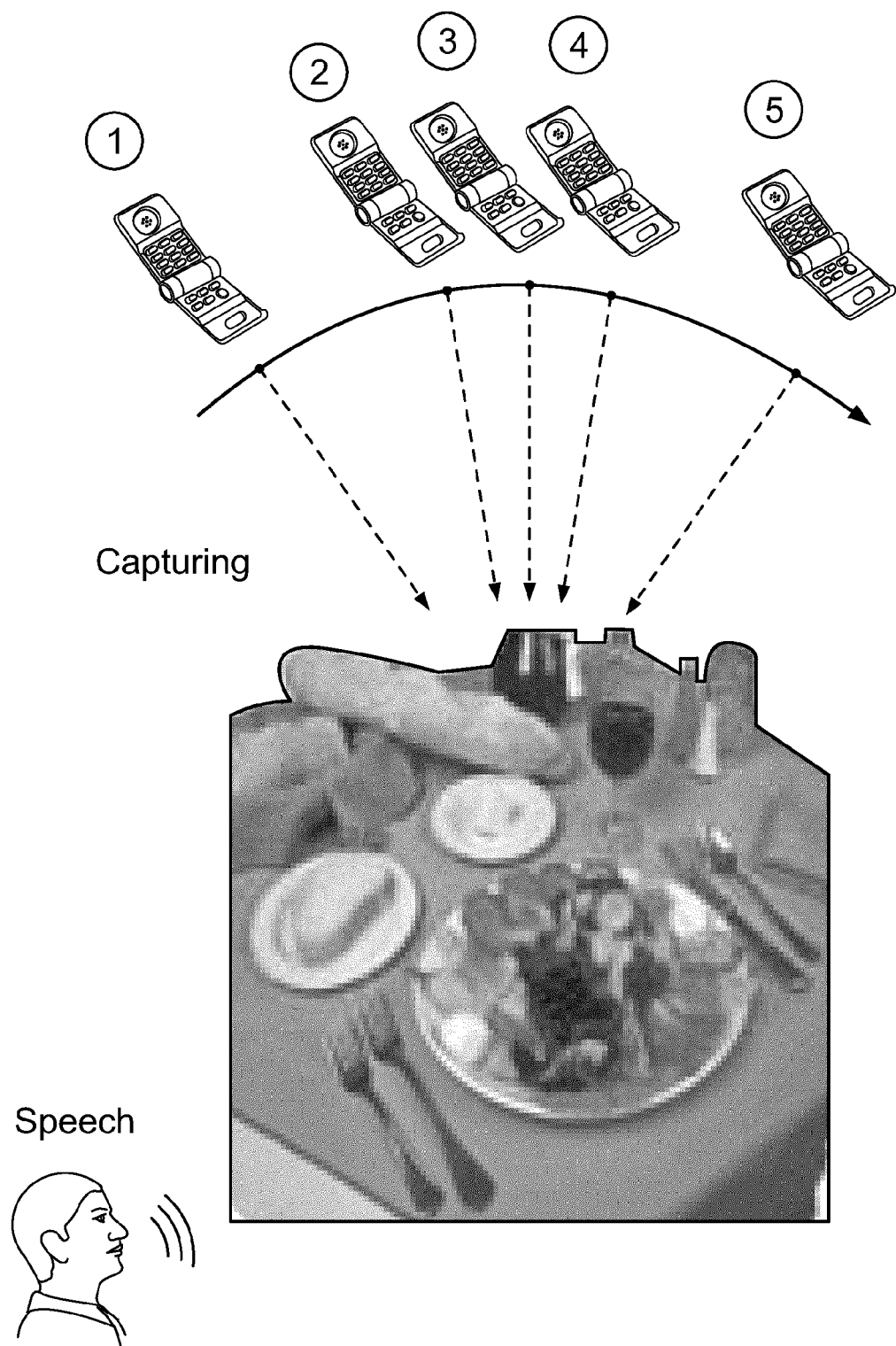
FIG. 11 shows one or more image capturing devices taking at least five images according to the method of FIG. 10.
Figure 12:
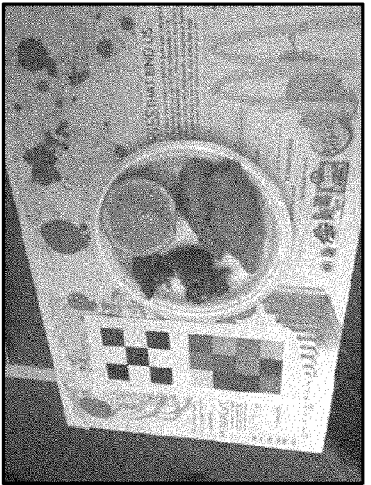
FIG. 12 show the least five images of a food plate taken by the one or more image capturing devices of FIG. 11.
Figure 12:
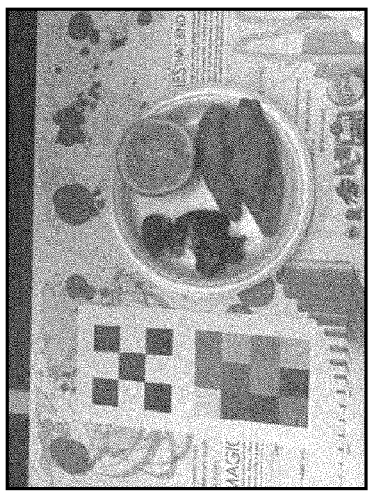
Figure 12:
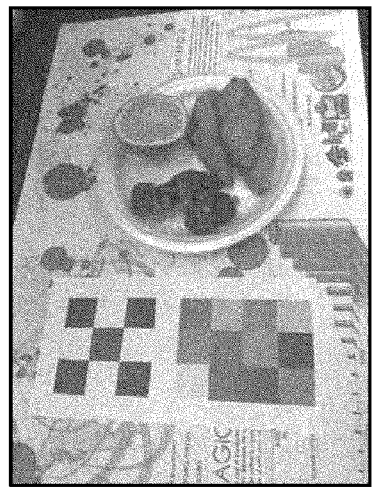
Figure 12:
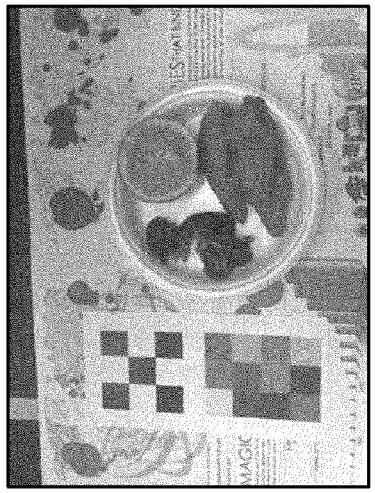
Figure 12:
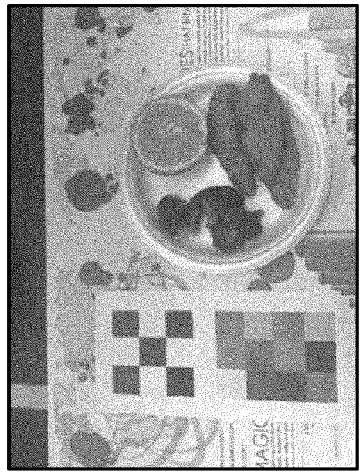
Figure 13:
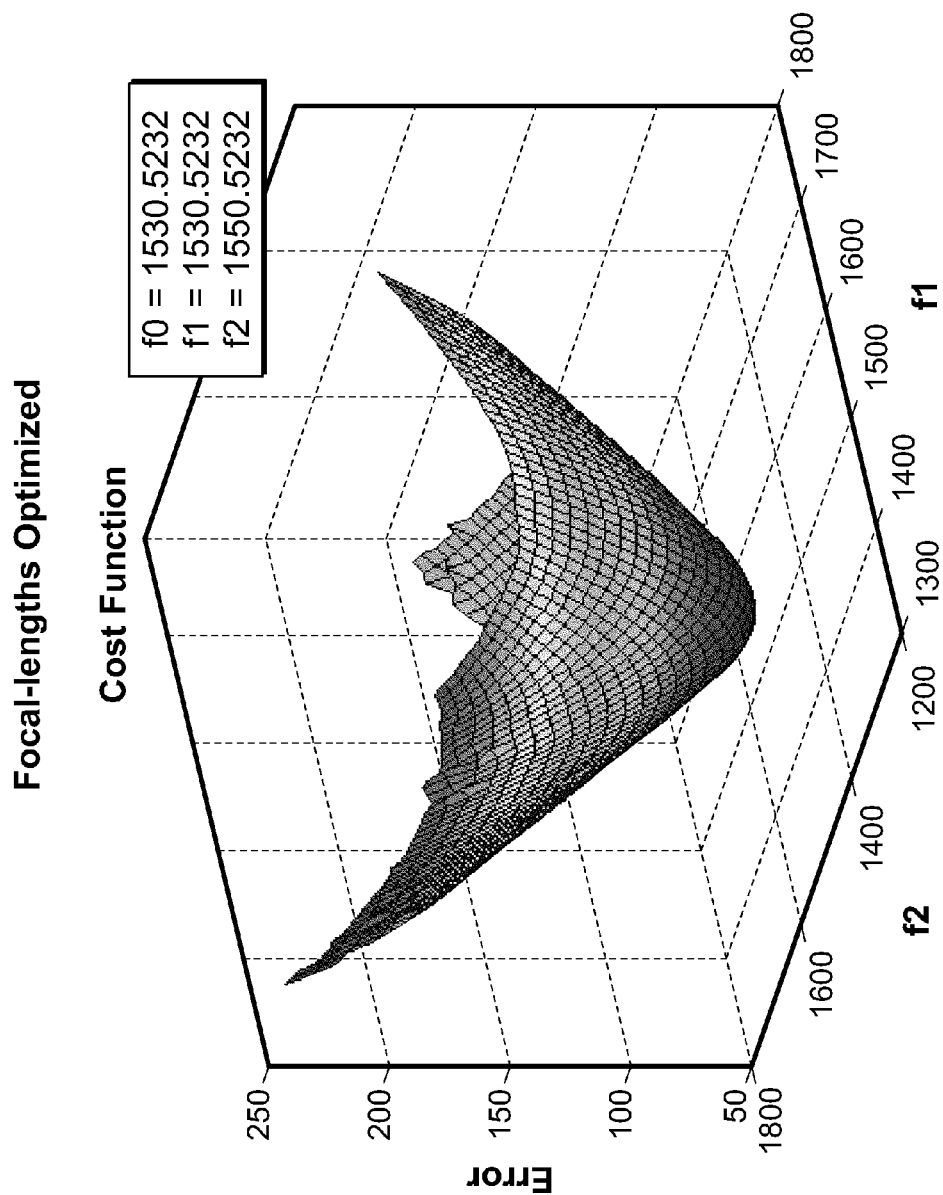
FIG. 13 depicts a graph of an optimization of focal length of each image capturing device in FIG. 11 as a result of applying the method of FIG. 10.

FIG. 10 is a process flow diagram illustrating exemplary steps for a method for estimating food volume of a food plate in 3D using cameras that may have different focal lengths and that has been classified and segmented, according to an embodiment of the present invention. The method illustrated in FIG. 10 overcomes the varying focal length problem described above using a two step pose estimation procedure 100, a 3D surface reconstruction procedure 102, and a food volume extraction procedure 104. Referring now to FIGS. 10-12, at steps 106, at least five images (see FIGS. 11 and 12, images 1 through 5), are taken at different positions above the plate with one or more image capturing devices (e.g., one or more cell phone cameras). In a preferred embodiment, a first set of images is taken and spaced at wide angles (e.g., images 1 and 3 in FIG. 11) compared to the at least three images of FIG. 7. This avoids the Bas-Relief ambiguity and also allows for optimizing unknown focal lengths (see FIG. 13). A second set of images (images 2, 4, and 5 in FIG. 11) is taken and spaced at closer angles than the first set of images.

In FIGS. 2 and 7, it is assumed that "a calibrated image capturing device" is needed to determine a 3D scale factor. In the method of FIG. 10, this requirement may be relaxed to "a partially calibrated image capturing device 32." While the distortion parameters and the optical center need to be known, the focal length need not be known exactly. In fact, the focal length cannot be pre-calibrated for most cell phones. The focal length is adjusted with every picture to capture the best possible image. Therefore, this adjustment needs to be incorporated within the algorithm as well. If the precise focal lengths are not used, pose estimation and reconstruction may become inaccurate, which affects a final volume estimation.

Figure 14:
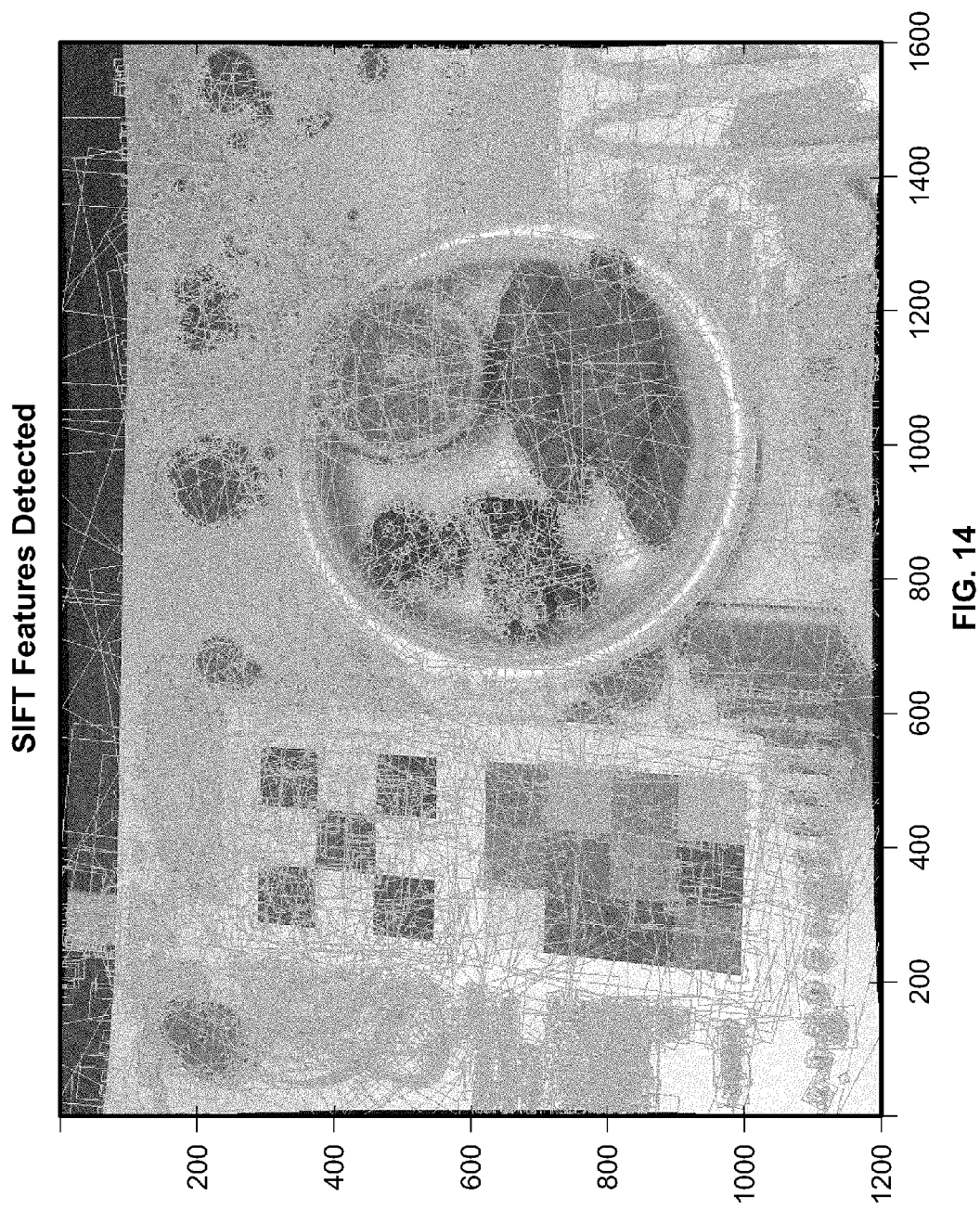
FIG. 14 is an image depicting detected SIFT features, according to an embodiment of the present invention.

At step 108, multiple (sparse) feature points in each image frame are extracted and matches between all of the at least five 2D images using SIFT feature points to produce feature correspondences (see FIG. 14), as described in David G. Lowe, "*Distinctive image features from scale-invariant keypoints,*" *International Journal of Computer Vision*, 60, 2 (2004), pp. 91-110. This allows for an increase in the separation between the images and thereby helped overcome the "Bas-relief ambiguity."

As described above for FIG. 7, each feature correspondence establishes a feature track, which lasts as long as it is matched across the images. These feature tracks are later sent into the pose estimation procedure 100 which is carried out using a preemptive RANSAC-based method as described in Nister et al. in the next step, the best pose at the end of the preemptive RANSAC routine is passed to a pose refinement step where iterative minimization of a robust cost function (derived from a Cauchy distribution) of the re-projection errors is performed through Levenberg-Marquardt method as described in Hartley et al. Using the above proposed algorithm, camera poses are estimated over five views such that poses for the second through fifth view are with respect to the camera coordinate frame in the first view. In order to stitch these poses, the poses are placed in the coordinate system of the first camera position corresponding to the first frame in the image sequence. At this point, the scale factor for the new pose-set (poses corresponding to the second through fifth views) is also estimated with another RANSAC scheme.

Figure 15:
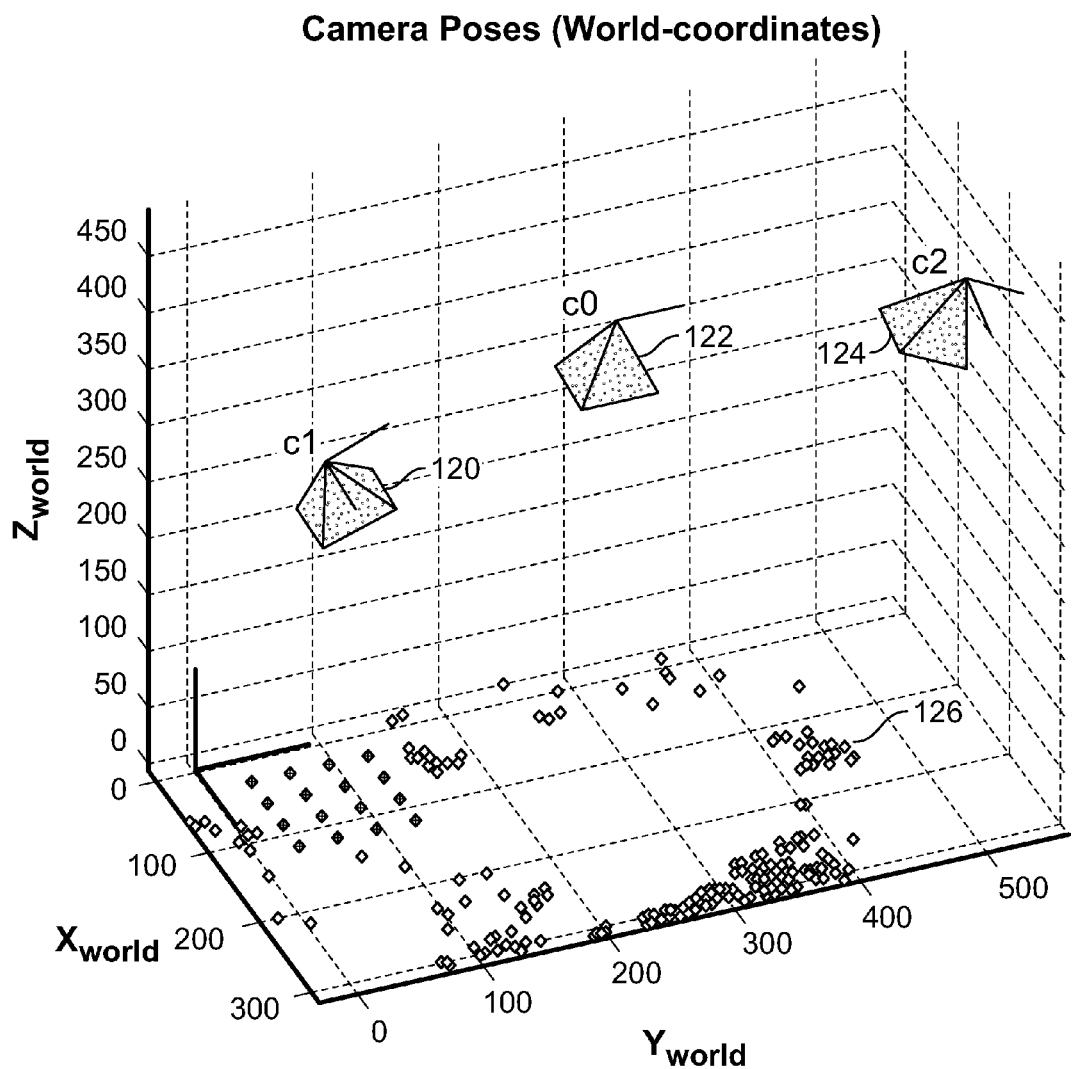
FIG. 15 depicts structure and poses estimated for a widebaseline view of a first set of images of FIGS. 11 and 12.
Figure 16:
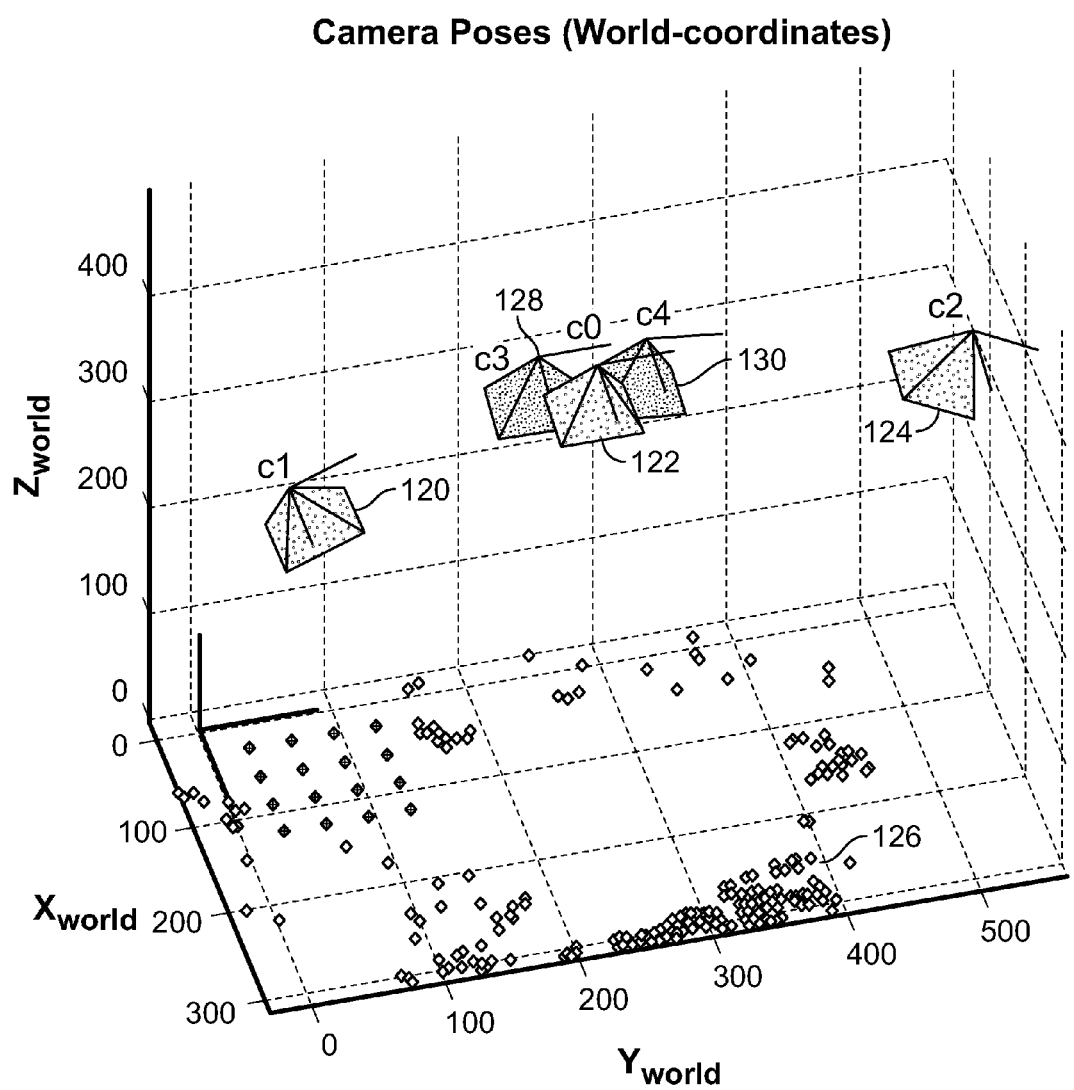
FIG. 16 depicts structure and poses estimated for a second set of images based on the previous structure and poses estimated for the first set of images of FIG. 15.

In a first step 110 of the two step pose estimation procedure 100, using the matched feature points belonging to frames 1, 3, and 5, relative camera poses among the three 2D images for frames 1, 3, and 5 are estimated and focal lengths are optimized (see FIG. 15). As a result, not only are the relative camera poses 120, 122, 124 for images 1, 3, and 5 determined, but also a sparse 3D point cloud 126 of matched features is produced. Referring to FIG. 16, in the second step 112 of a two step pose estimation procedure 100, the previously computed sparse (wideband) structure (i.e., the sparse 3D point cloud 126 of matched features) is used for estimating the poses 128, 130 as well as the focal lengths of a remaining two images 2 and 4 of FIG. 11. In the second step 112 of the two step pose estimation procedure 100, the matched features between images 2 and 4 are employed along with the sparse 3D point cloud 126 from step 110 to estimate the pose of image 4. This process is repeated for image 5.

Figure 17:
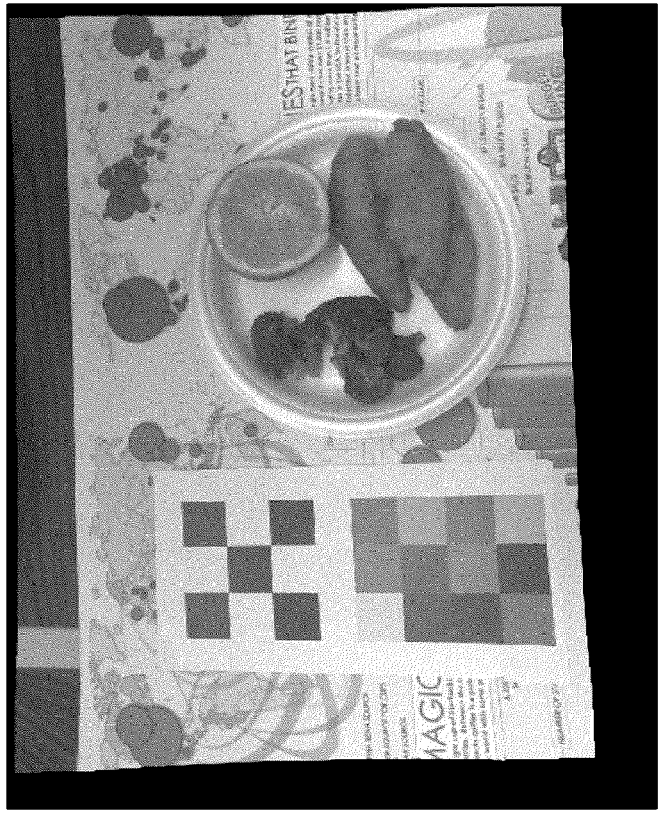
FIG. 17 depicts images rectified according to an embodiment of the present invention.
Figure 17:

Having estimated the poses of the one or more image capturing devices 32, in an image rectification step 114 of the 3D surface reconstruction procedure 102, frames 4 and 5 of FIG. 11 are rectified to a standard stereo pair (see FIG. 17) using the relative camera poses estimated in step 112. As used herein, a standard stereo pair refers to a pair of images produced by two cameras whereby image planes of the cameras as well as their focal lengths are one and the same. Furthermore, the cameras are rotated around their optical axis so that the line joining their principal points are parallel to the X-axis of the image plane. As used herein, rectification refers to a linear projective transformation of images from two arbitrary cameras on to a common plane resulting from rotating and re-scaling the cameras to bring them into a standard stereo configuration (as defined above).

Figure 18:
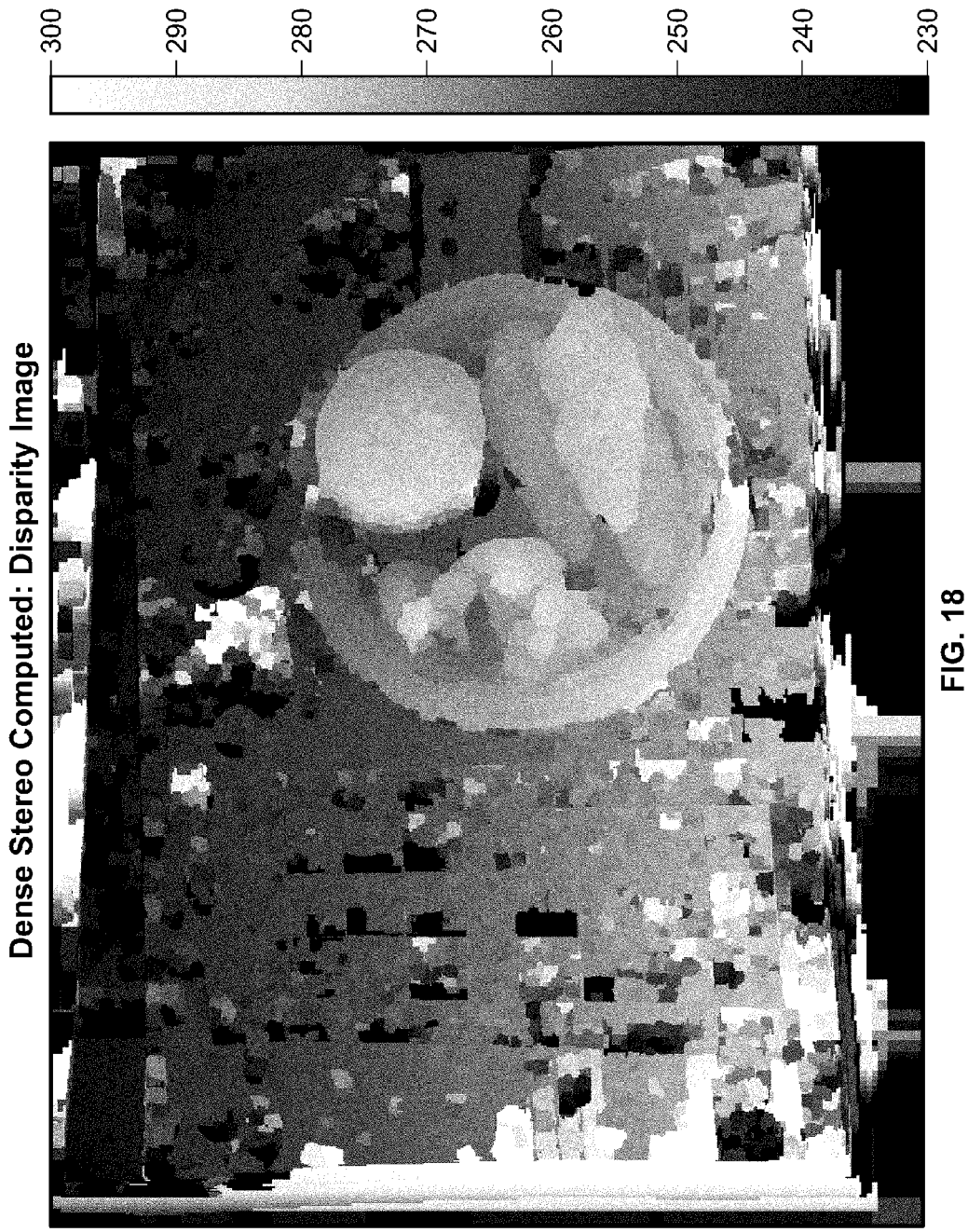
FIG. 18 depicts a dense stereo disparity image, according to an embodiment of the present invention.

In a dense stereo reconstruction step 116 of the 3D surface reconstruction procedure 102, the rectified stereo pair of images is decomposed using an image pyramid in a coarse-to-fine manner to estimate a disparity image (see FIG. 18) as described in Mikhail Sizinsev and Richard P. Wildes, "Course-to-fine stereo vision with accurate 3D boundaries," Image and Vision Computing (IVC), 2009. As used herein, disparity/binocular disparity refers to the difference in image location of an object seen by left and right cameras, resulting from the horizontal separation of the cameras. This disparity image computation is done after the process of image rectification. This construction of stereo images allows for a disparity in only the horizontal direction (i.e., there is no disparity in the y image coordinates). As used herein, a disparity image is an image wherein the size of the left image (for example), whose pixels store the value of the disparity (in pixels) for each pixel in the left image and the corresponding points in the right image. The disparity image typically computed by taking a "patch" (often square) of pixels in the left image and finding the corresponding patch in the right image.

Figure 19:
FIG. 19 depicts a dense stereo depth map, according to an embodiment of the present invention.
Figure 20:
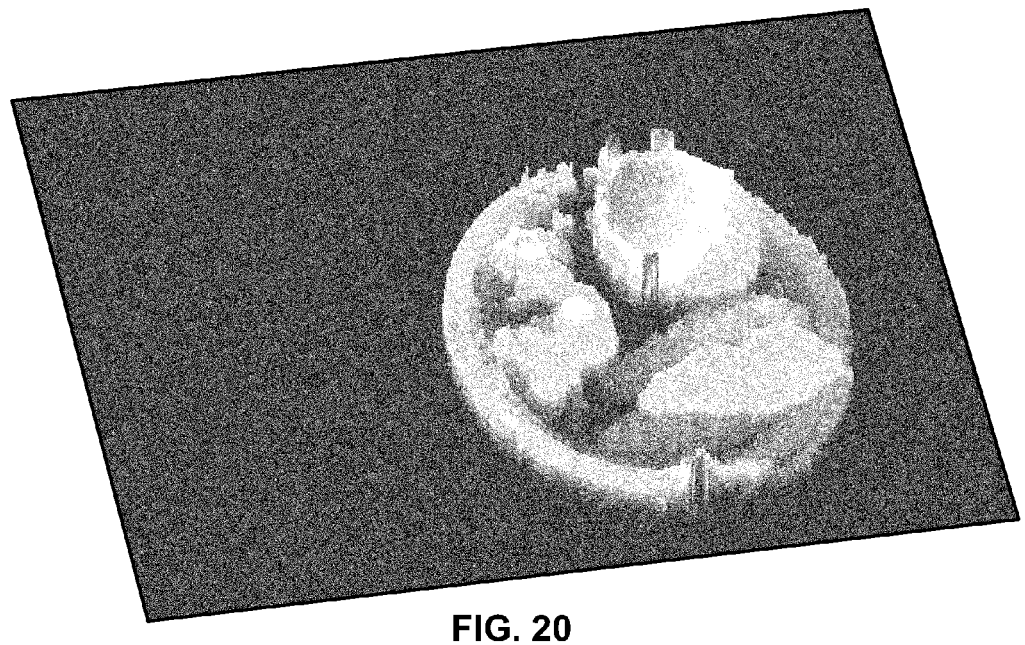
FIGS. 20 and 21 show two views of reconstructed 3D point clouds of the surfaces of food items, constructed according to an embodiment of the present invention.
Figure 21:

Once rectified, image patch correspondences between the rectified stereo pair and the disparity image are established over the entire rectified stereo pair and the disparity image using correlation which results in a correlated disparity image. In a food surface extraction step 118 of the 3D surface reconstruction procedure 102, the correlated disparity image is converted to a depth image (see FIG. 19) for a selected frame. Disparity and distance from the camera (i.e., depth) are negatively correlated. As the distance from the camera increases, the disparity decreases. This relationship may be described by the following equation: $z=Bf/d$, where z is the depth, B is the base-line (i.e., the separation between the camera centers), f is the focal length and d is the disparity. Using this equation, the disparity value at each pixel of the disparity image may be converted to a depth value thus forming the depth image (sometime referred to as a depth map). A depth value for a selected pixel in the depth image along with pixel coordinates of the corresponding pixel in the depth image and the camera pose information for the selected frame are used to locate the selected pixel in 3D space coordinates. Repeating this process for all of the remaining pixels in the depth image results in a reconstructed 3D point cloud of the surfaces the food items (see FIGS. 20 and 21).

Figure 22:
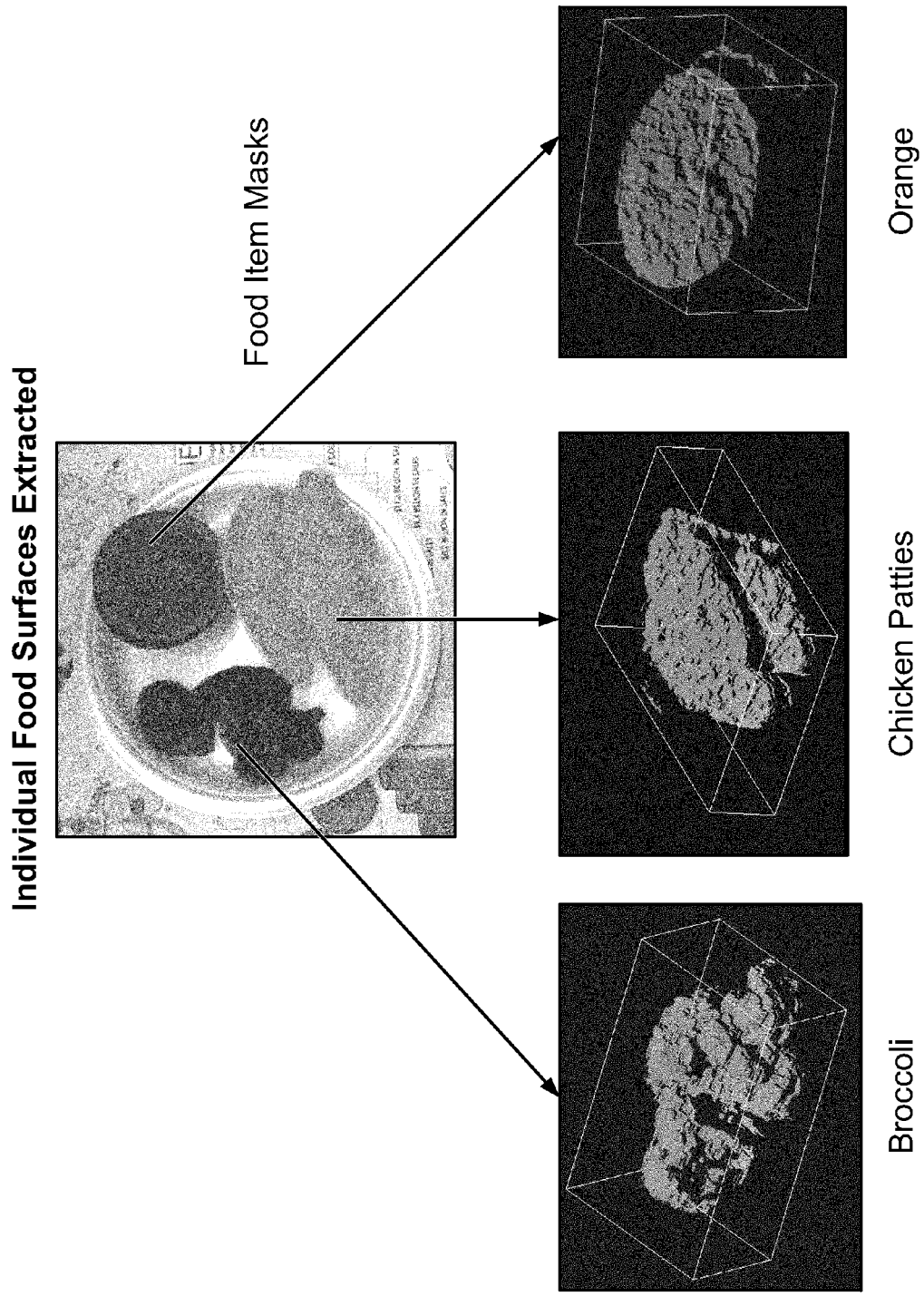
FIG. 22 displays examples of a 3D point clouds for the individual items on a food plate, constructed according to an embodiment of the present invention.

FIG. 22 displays examples of a 3D point clouds for the individual items on a food plate. Since the volume of each food item needs to be measured with respect to a reference surface, estimation of the table plane is carried out as a prerequisite step as described above for FIGS. 7 and 22. At food volume extraction step 104, from the reconstructed 3D point cloud, both the 3D scale and the table plane are estimated to compute the 3D volume of each food item (see FIGS. 8A-9B and 23). Segmentation masks produced by the classification engine (See FIGS. 4A and 4B above) are used to partition the recovered surface into regions belonging to a particular type of food. This provides a denser reconstruction with fewer holes to fill, resulting in a more accurate food volume estimation.

In computing a reconstructed 3D point cloud of the surfaces the food items, there is still a scale ambiguity in the final poses of the five 2D frames. In order to recover a global scale factor, an object with known dimensions is placed and captured along with the plate of food in an image in a 3D scale determination step. For simplicity, according to an embodiment of the present invention, the metric calibration checkerboard 46 of FIG. 2 may be employed. In order to compute 3D scale, each corner of the checker-board in an image is detected followed by its reconstruction to obtain corresponding 3D coordinates. The size of each checker-board square is determined in 3D from its respective corners according to Equation 3 described above. Once the 3D scale is computed using the checker-board, an overall scale correction is made to all the camera poses over the set of frames and the frames are mapped to a common coordinate system.

Following stereo reconstruction, a dense 3D point cloud for all points on the plate is obtained.

Table plane estimation is performed by employing RANSAC to fit a 3D plane equation on feature points earlier used for camera pose estimation. To obtain better accuracy, points falling on the plate are removed for the purpose of plane fitting by using the boundaries obtained from the plate detection step. Once the table plane has been estimated, it is used to slice the entire point cloud into two portions such that only 3D points above the plane are considered for the purpose of volume estimation.

Figure 23:
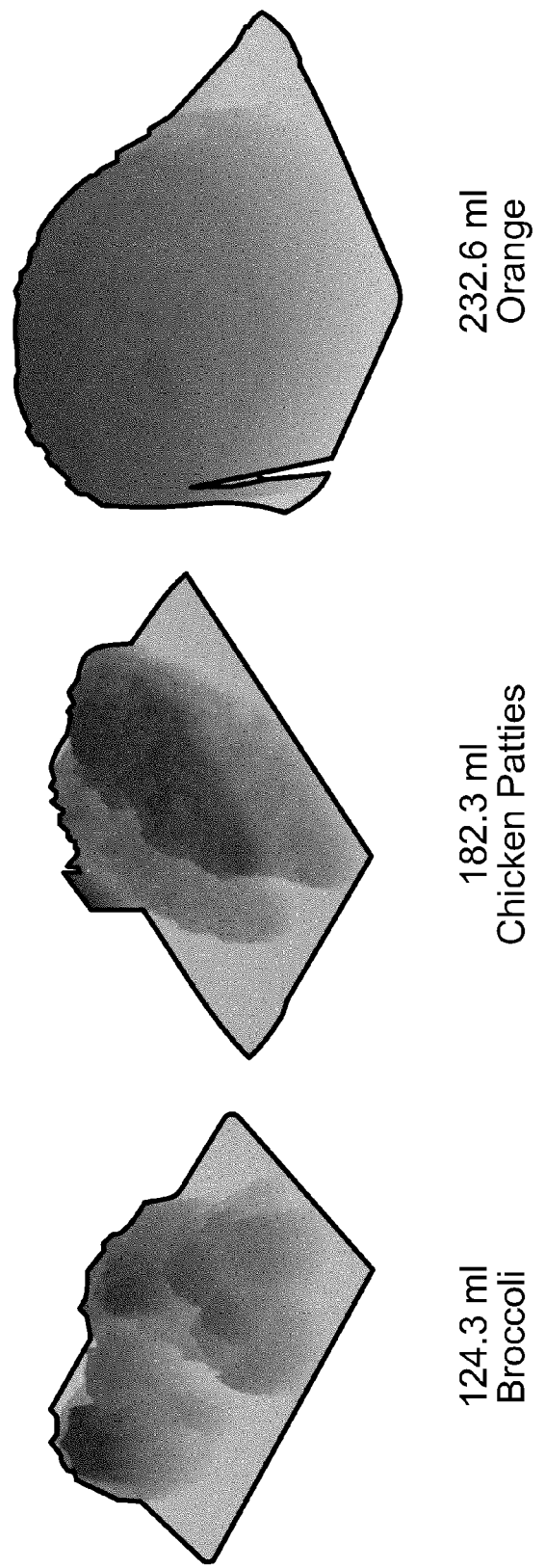
FIG. 23 displays examples of food volumes for individual food items, constructed according to an embodiment of the present invention.

Referring to FIGS. 23 and 10, the volume estimation step 104 is carried out in two sub-steps. First, Delaunay triangulation is performed to fit the surface of food. Second, total volume of the food ($V_{Total}$) is calculated as a sum of individual volumes ($V_i$) for each Delaunay triangles obtained from the previous step. Equation 4 above shows computation of total food volume where K is the total number of triangles.

One of the main tasks of the present invention is to report volumes of each individual food item on a user's plate. This is done by using the binary label map obtained after food recognition. The label map for each food item consists of non-zero pixels that have been identified as belonging to the food item of interest and zero otherwise. Using this map, a subset of the 3D point cloud is selected that corresponds to reconstruction of a particular food label that is then feed it into the volume estimation process. This step is repeated for all food items on the plate to compute their respective volumes.

Experiments were carried out to test the accuracy of certain embodiments of the present invention. In order to standardize analysis of various foods, the USDA Food and Nutrient Database for Dietary Studies (FNDDS) was consulted, which contains more than 7,000 foods along with the information such as, typical portion size and nutrient value. 400 sets of images containing 150 commonly occurring food types in the FNDDS were collected. This data was used to train classifiers. An independently collected data set with 26 types of foods was used to evaluate the recognition accuracy. N (in this case, N=500) patches were randomly sampled from images of each type of food and the accuracy of classifiers trained in different ways was evaluated as follows:

Using a single MR feature ($\sigma_{x_i}$=0.5);
Using single RGB neighborhood features (at 3×3 scale);
Using combined features with fixed number of training samples per food label;
Using feature selection in the proposed bootstrap framework.

Figure 24:
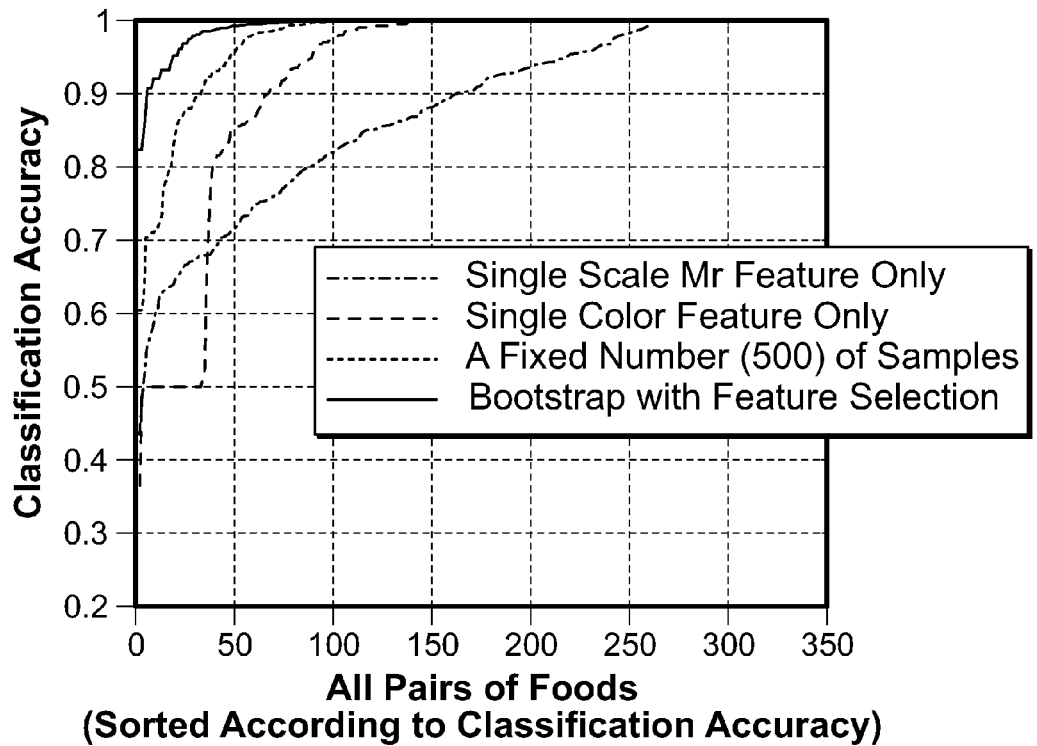
FIG. 24 shows a comparison of sorted pair-wise classification accuracy obtained during testing of the system of FIG. 2.

For comparison, all pair-wise classifiers were trained (13× 25=325) and classification accuracy was sorted. As each pair-wise classifier $c_{i,j}$ was evaluated over 2N patches (N patches in label i and N patches in label j), the pair-wise classification accuracy is the ratio of correct instances over 2N. FIG. 24 shows the comparison of sorted pair-wise classification accuracy. By applying the feature selection in the bootstrap procedure, a significant improvement was achieved over using a single feature and using a fixed number of training samples.

Figure 25:
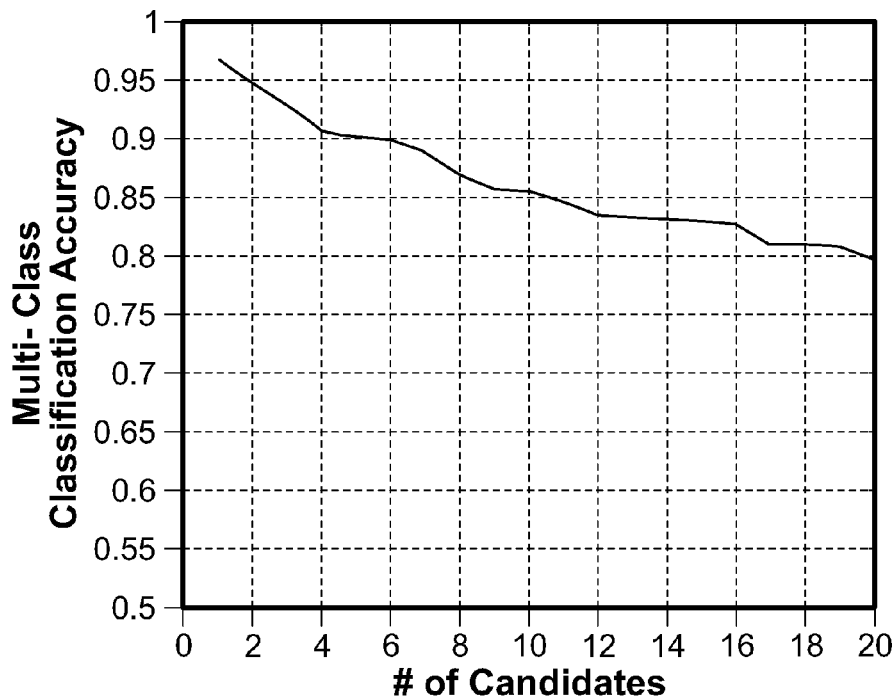
FIG. 25 is a graph that plots the accuracy of the multi-class classifier obtained during testing of the system of FIG. 2.

In order to evaluate the multi-class classifiers assembled online based on user input, K confusing labels were randomly added to each ground truth label in the test set. Hence, the multi-class classifier had K+1 candidates. The accuracy of the multi-class classifier is shown in FIG. 25. As can be seen in FIG. 25, accuracy drops as the number of candidates increases. The larger the number of candidates, the more likely the confusion between them. However, the number of foods in a meal is rarely greater than 6, for which about a 90% accuracy was achieved.

Figure 26:
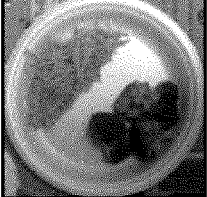
FIG. 26 shows qualitative results of classification and 3D volume estimation obtained during testing of the system of FIG. 2.

Qualitative results of classification and 3D volume estimation are shown in FIG. 26 (Table 2): the first column shows the images after scale and color normalization; the second column shows the classification results and the last column shows the reconstructed 3D surface obtained using Delaunay triangulation and the estimated table plane, which are used for computing the volume. Table 3 shows the quantitative evaluation of these sets. In the system of the present invention, volume is returned in milliliter units. This value may be converted to calories by indexing into the FNDDS.

TABLE 3

Quantitative classification and 3D volume results

| Set # | Food | Ground truth (in ml) | Estimate (in ml) | Error (%) |
|---|---|---|---|---|
| 1 | Broccoli | 150 | 143.5 | 4.3 |
|  | Carrots | 120 | 112.3 | 6.4 |
| 2 | Orange | 195 | 189.4 | 2.9 |
|  | Bagel | 300 | 310.5 | 3.5 |
| 3 | Fries | 200 | 194.8 | 2.6 |
|  | Steak | 190 | 203.9 | 7.3 |
|  | Broccoli | 180 | 186.3 | 3.5 |
| 4 | Spinach | 160 | 151.2 | 5.5 |
|  | Cucumber | 100 | 98.2 | 1.5 |
|  | Olives | 100 | 104.8 | 4.8 |
|  | Broccoli | 120 | 114.2 | 4.8 |
|  | Peppers | 80 | 82.7 | 3.4 |
| 5 | Olives | 100 | 98.4 | 1.6 |
|  | Carrots | 90 | 82.7 | 8.1 |
|  | Peas | 120 | 123.8 | 3.2 |
|  | Chickpeas | 100 | 103.1 | 3.1 |
|  | Cucumber | 140 | 144.2 | 3.0 |
|  | Peppers | 90 | 84.1 | 6.6 |
| 6 | Chicken | 130 | 121.2 | 6.8 |
|  | Fries | 150 | 133.6 | 10.9 |

Figure 27:
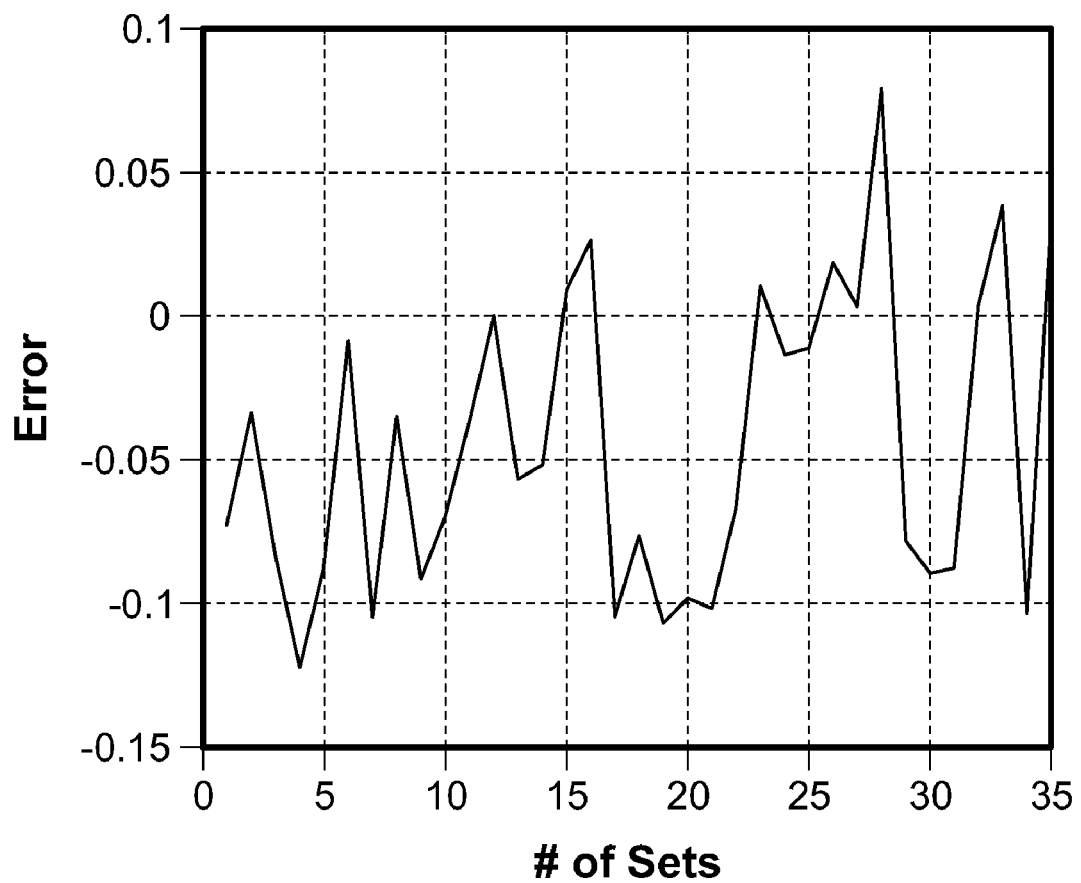
FIG. 27 shows a plot of error rate per image set for testing the accuracy and repeatability of volume estimation under different capturing conditions obtained during testing of the system of FIG. 2.

To test the accuracy and repeatability of volume estimation under different capturing conditions, an object with a known ground truth volume is given as input to the system. For this evaluation, 35 image sets of the object were captured taken at different viewpoints and heights. FIG. 27 shows a plot of error rate per image set. The average error in volume is 5.75 (±3.75) % over all the sets.

The experimental system was run on a Intel Xeon workstation with 3 GHz CPU and 4 GB of RAM. The total turnaround time was 52 seconds (19 seconds for classification and 33 seconds for dense stereo reconstruction and volume estimation on a 1600×1200 pixel image). The experimental system was not optimized and ran on a single core.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for estimating a volume of at least one food item on a food plate, the method being executed by at least one processor, comprising the steps of:

receiving a first plurality of images and a second plurality of images from different positions above a food plate, wherein angular spacing between the positions of the first plurality of images are greater than angular spacing between the positions of the second plurality of images;

estimating a first set of poses of each of the first plurality of images;

estimating a second set of poses of each of the second plurality of images based on at least the first set of poses;

rectifying a pair of images taken from each of the first and second plurality of images based on at least the first and second set of poses;

reconstructing a 3D point cloud based on at least the rectified pair of images;

estimating at least one surface of the at least one food item above the food plate based on at least the reconstructed 3D point cloud; and estimating the volume of the at least one food item based on the at least one surface.

2. The method of claim 1, further comprising extracting and matching a plurality of scale invariant feature transform (SIFT feature) points among each of the first and second plurality of images to produce feature correspondences.

3. The method of claim 2, further comprising the step of producing a sparse 3D point cloud of matched features corresponding to the first plurality of images.

4. The method of claim 3, wherein the step of estimating a second set of poses of each of the second plurality of images is further based on the sparse 3D point cloud.

5. The method of claim 4, wherein focal lengths corresponding to the first plurality of images are optimized based on at least a subset of the feature correspondences, and wherein focal lengths corresponding to the second plurality of images are optimized based on at least the sparse 3D point cloud.

6. The method of claim 2, wherein the step of estimating at least one surface based on at least the reconstructed 3D point cloud further comprises the step of estimating a table plane associated with the food plate.

7. The method of claim 6, wherein the step of estimating the table plane further comprises the steps of employing RANSAC to fit a 3D plane equation to feature points used for pose estimation; and
removing points falling on the plate for the purpose of plane fitting by using the boundaries obtained from a plate detection step.

8. The method of claim 6, further comprising the step of using the estimated table plane to slice the reconstructed 3D point cloud into an upper and lower portion such that only 3D points above the table plane are considered for the purpose of volume estimation.

9. The method of claim 8, further comprising the step of employing at least one segmentation mask produced by a classification engine to partition the 3D points above the table plane into at least one surface belonging to the at least one food item.

10. The method of claim 1, wherein the step of reconstructing the 3D point cloud further comprises the step of:
(a) decomposing the rectified pair of images using an image pyramid to estimate a disparity image;
(b) establishing image patch correspondences between the rectified pair of images and the disparity image over the entire rectified stereo pair and the disparity image using correlation to produce a correlated disparity image;
(c) converting the correlated disparity image to a depth image for a selected image of the rectified pair of images;
(d) employing a depth value for a selected pixel in the depth image along with pixel coordinates of the corresponding pixel in the depth image and pose information for the selected image to locate the selected pixel in 3D space coordinates; and
(e) repeating step (d) for all of the remaining pixels in the depth image to produce the reconstructed 3D point cloud.

11. The method of claim 10, wherein the step of reconstructing the 3D point cloud further comprises the step of estimating a 3D scale factor by employing an object with known dimensions placed and captured along with the at least one food item on a food plate in the plurality of images.

12. The method of claim 1, wherein estimating a pose further comprises the steps of:
(a) establishing a plurality of feature tracks from image patch correspondences;
(b) applying a preemptive random sample consensus (RANSAC)-based method to the feature tracks to produce a best pose for a first camera view; and
(c) refining the best pose using an iterative minimization of a robust cost function of re-projection errors through a Levenberg-Marquardt method to obtain a final pose.

13. The method of claim 1, wherein computing the volume of the at least one food item further comprises the steps of:
(a) performing Delaunay triangulation to fit the at least one surface of the at least one of food item to obtain a plurality of Delaunay triangles; and
(b) calculating a volume of the at least one food item as a sum of individual volumes for each Delaunay triangle obtained from step (a).

14. A system for estimating a volume of at least one food item on a food plate, comprising:
a processor for:
receiving a first plurality of images and a second plurality of images from different positions above a food plate, wherein angular spacing between the positions of the first plurality of images are greater than angular spacing between the positions of the second plurality of images;
estimating a first set of poses of each of the first plurality of images;
estimating a second set of poses of each of the second plurality of images based on at least the first set of poses;
rectifying a pair of images taken from each of the first and second plurality of images based on at least the first and second set of poses;
reconstructing a 3D point cloud based on at least the rectified pair of images;
estimating at least one surface of the at least one food item above the food plate based on at least the reconstructed 3D point cloud; and
estimating the volume of the at least one food item based on the at least one surface.

15. The system of claim 14, further comprising at least one image capturing device for capturing the first plurality of images and the second plurality of images and for providing the first plurality of images and the second plurality of images to the processor.

16. The system of claim 14, wherein reconstructing the 3D point cloud based on at least the rectified pair of images further comprises:
(a) decomposing the rectified pair of images using an image pyramid to estimate a disparity image;
(b) establishing image patch correspondences between the rectified pair of images and the disparity image over the entire rectified stereo pair and the disparity image using correlation to produce a correlated disparity image;
(c) converting the correlated disparity image to a depth image for a selected image of the rectified pair of images;
(d) employing a depth value for a selected pixel in the depth image along with pixel coordinates of the corresponding pixel in the depth image and pose information for the selected image to locate the selected pixel in 3D space coordinates; and
(e) repeating step (d) for all of the remaining pixels in the depth image to produce the reconstructed 3D point cloud.

17. A non-transitory computer-readable medium storing computer code for estimating a volume of at least one food item on a food plate, the code being executed by at least one processor, wherein the computer code comprises code for:

receiving a first plurality of images and a second plurality of images from different positions above a food plate, wherein angular spacing between the positions of the first plurality of images are greater than angular spacing between the positions of the second plurality of images;

estimating a first set of poses of each of the first plurality of images;

estimating a second set of poses of each of the second plurality of images based on at least the first set of poses;

rectifying a pair of images taken from each of the first and second plurality of images based on at least the first and second set of poses;

reconstructing a 3D point cloud based on at least the rectified pair of images;

estimating at least one surface of the at least one food item above the food plate based on at least the reconstructed 3D point cloud; and estimating the volume of the at least one food item based on the at least one surface.

18. The computer readable medium of claim 17, further comprising code for extracting and matching a plurality of scale invariant feature transform (SIFT) feature points among each of the first and second plurality of images to produce feature correspondences.

19. The computer readable medium of claim 18, further comprising code for producing a sparse 3D point cloud of matched features corresponding to the first plurality of images.

20. The computer readable medium of claim 19, wherein code for estimating a second set of poses of each of the second plurality of images is further based on the sparse 3D point cloud.

21. The computer readable medium of claim 20, wherein focal lengths corresponding to the first plurality of images are optimized based on at least a subset of the feature correspondences, and wherein focal lengths corresponding to the second plurality of images are optimized based on at least the sparse 3D point cloud.

22. The computer readable medium of claim 17, wherein code for reconstructing the 3D point cloud further comprises code for:
(a) decomposing the rectified pair of images using an image pyramid to estimate a disparity image;
(b) establishing image patch correspondences between the rectified pair of images and the disparity image over the entire rectified stereo pair and the disparity image using correlation to produce a correlated disparity image;
(c) converting the correlated disparity image to a depth image for a selected image of the rectified pair of images;
(d) employing a depth value for a selected pixel in the depth image along with pixel coordinates of the corresponding pixel in the depth image and pose information for the selected image to locate the selected pixel in 3D space coordinates; and
(e) repeating step (d) for all of the remaining pixels in the depth image to produce the reconstructed 3D point cloud.

* * * * *